11 Sheets—Sheet 1.

H. B. MORRIS.

LOOM FOR WEAVING CANE.

No. 11,573. Reissued Nov. 24, 1896.

Witnesses
J. M. Wilkerson
Guy E. Davis

Inventor,
Henry B. Morris,
By his Attorneys Baldwin Davidson & Wight

11 Sheets—Sheet 2.

H. B. MORRIS.

LOOM FOR WEAVING CANE.

No. 11,573. Reissued Nov. 24, 1896.

Witnesses;

J. M. W. Throw

Guy E. Davis.

Inventor,

Henry B. Morris

By his Attorneys,

Baldwin, Davidson & Wight

H. B. MORRIS.

LOOM FOR WEAVING CANE.

No. 11,573. Reissued Nov. 24, 1896.

Witnesses
J. M. Wilkerson
Guy E. Davis

Inventor,
Henry B. Morris,
By his Attorneys, Baldwin, Davidson & Wight

11 Sheets—Sheet 4.

H. B. MORRIS.

LOOM FOR WEAVING CANE.

No. 11,573. Reissued Nov. 24, 1896.

Witnesses
J. M. Witherow
Guy E. Davis

Inventor,
Henry B. Morris,
By his Attorneys Pollson, Davidson & Wight

11 Sheets—Sheet 5.

H. B. MORRIS.

LOOM FOR WEAVING CANE.

No. 11,573. Reissued Nov. 24, 1896.

Witnesses
J. M. Thorn
Guy E. Davis

Inventor,
Henry B. Morris,
By his Attorneys,
Baldwin Davidson & Wight

H. B. MORRIS.

LOOM FOR WEAVING CANE.

No. 11,573. Reissued Nov. 24, 1896.

Witnesses;
J. M. Withrow
Guy E. Davis

Inventor
Henry B. Morris,
By his Attorneys,
Pattison Davidson & Wight

H. B. MORRIS.
LOOM FOR WEAVING CANE.
No. 11,573. Reissued Nov. 24, 1896.
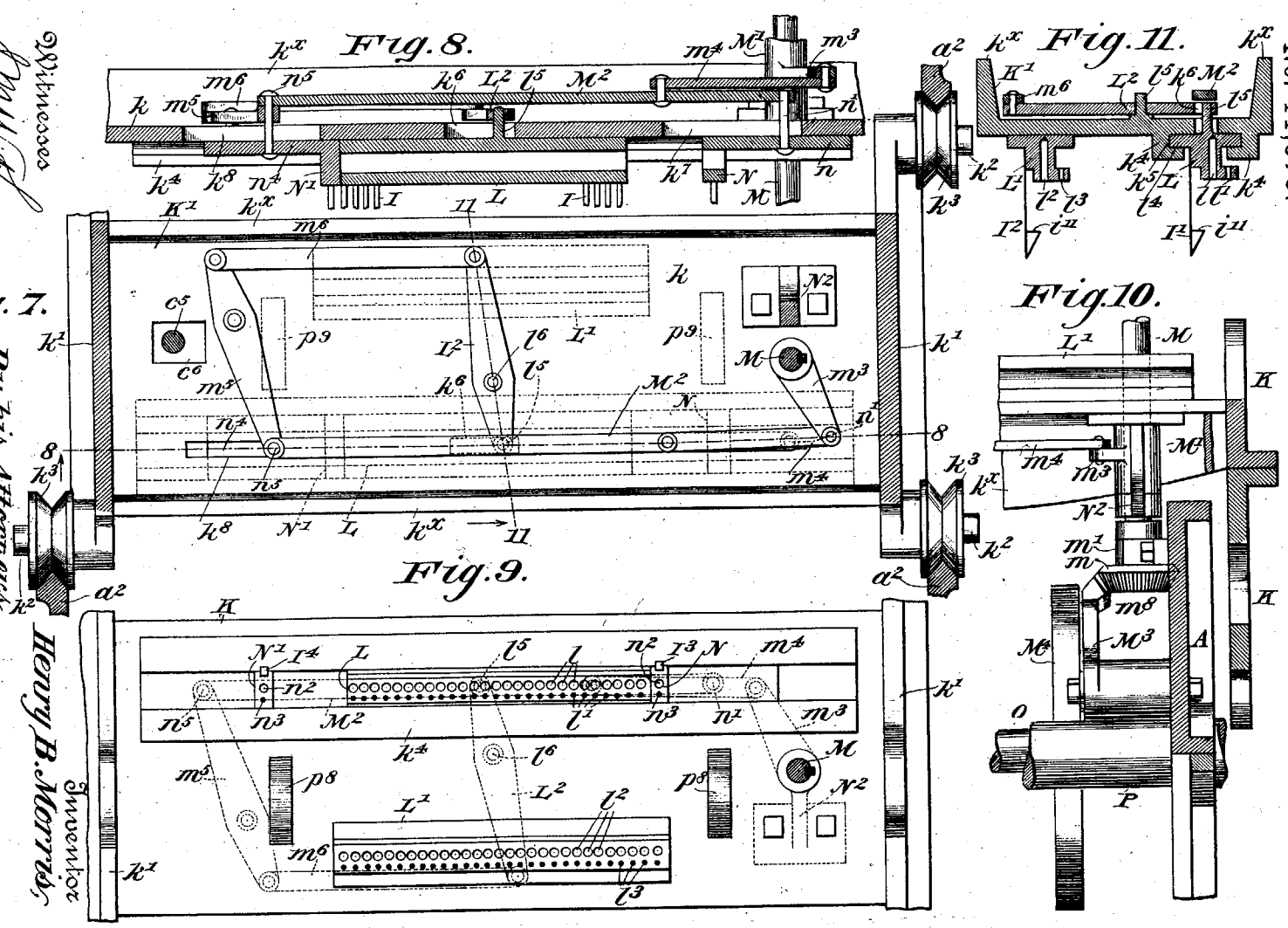
Witnesses
J. M. W. Thorow
Guy E. Davis
Inventor
Henry B. Morris,
By his Attorneys
Baldwin Davidson & Wight

H. B. MORRIS.

LOOM FOR WEAVING CANE.

No. 11,573. Reissued Nov. 24, 1896.

Witnesses;

J. M. Witherow.

Guy E. Davis.

Inventor

Henry B. Morris.

By his Attorneys;

Baldwin, Davidson & Wight.

H. B. MORRIS.

LOOM FOR WEAVING CANE.

No. 11,573. Reissued Nov. 24, 1896.

Witnesses

J. M. Witherow

Guy E. Davis

Inventor,

Henry B. Morris,

By his Attorneys

Baldwin, Davidson & Wight.

H. B. MORRIS.
LOOM FOR WEAVING CANE.
No. 11,573. Reissued Nov. 24, 1896.
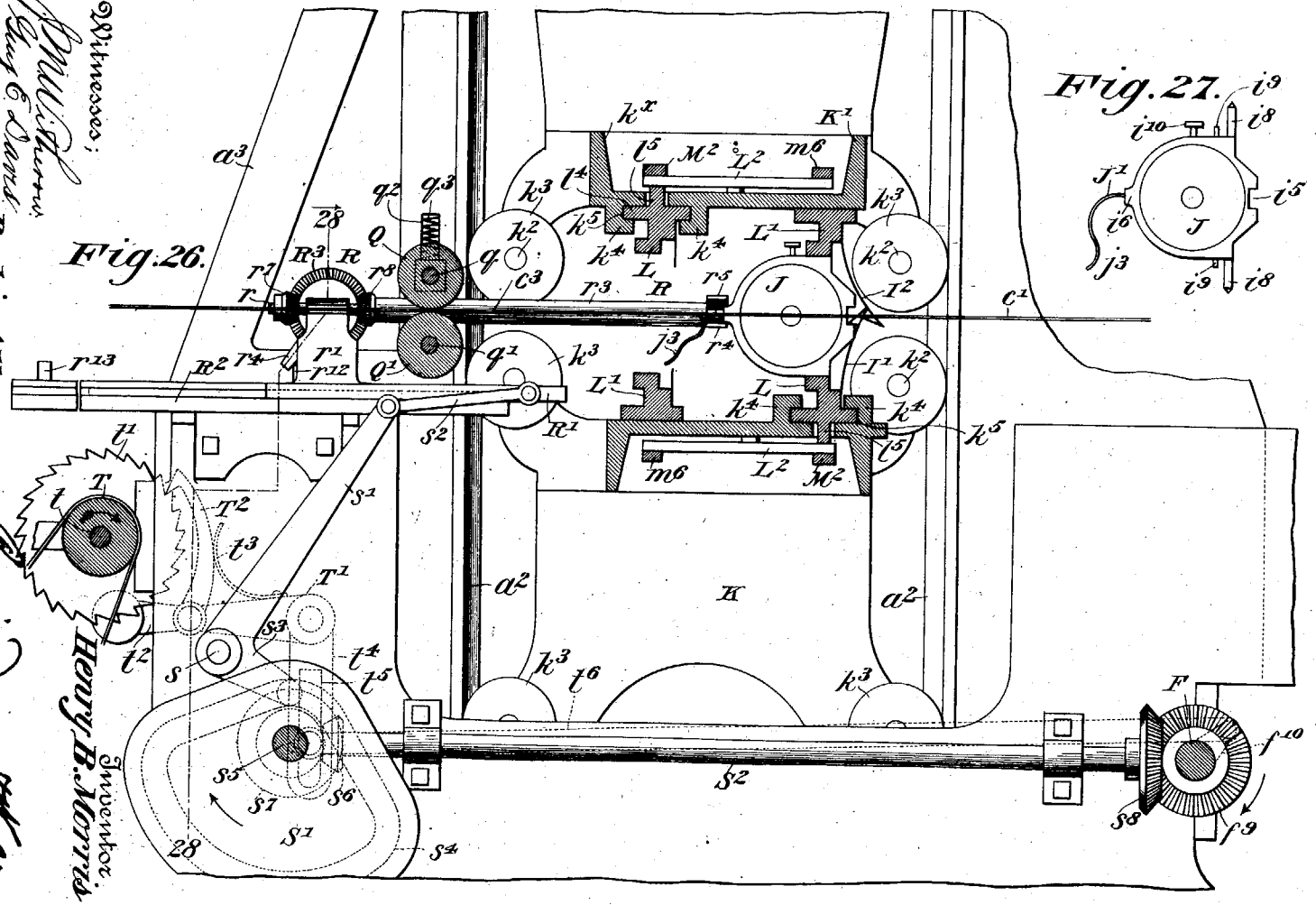
Witnesses;
J. M. Witherow
Guy E. Davis
Inventor
Henry B. Morris
By his Attorneys, Baldwin, Davidson & Wight

H. B. MORRIS.
LOOM FOR WEAVING CANE.
No. 11,573. Reissued Nov. 24, 1896.
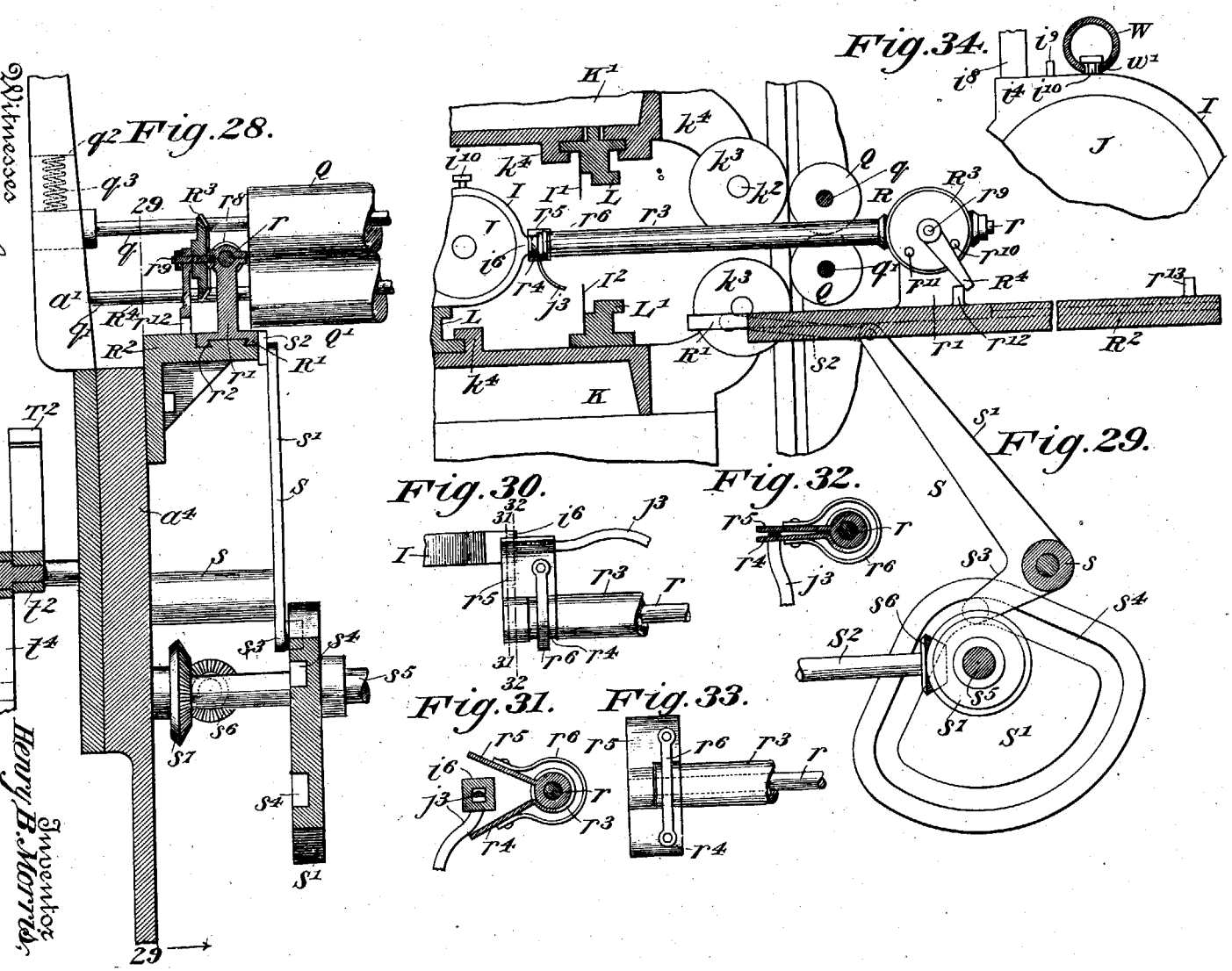
Witnesses
J. M. Withrow.
Guy E. Davis.
Inventor
Henry B. Morris,
By his Attorneys,
Baldwin Davidson & Wight.

UNITED STATES PATENT OFFICE.

HENRY B. MORRIS, OF MICHIGAN CITY, INDIANA, ASSIGNOR TO FORD, JOHNSON & CO., OF SAME PLACE.

LOOM FOR WEAVING CANE.

SPECIFICATION forming part of Reissued Letters Patent No. 11,573, dated November 24, 1896.

Original No. 549,930, dated November 19, 1895. Application for reissue filed February 4, 1896. Serial No. 578,059.

*To all whom it may concern:*

Be it known that I, HENRY B. MORRIS, a citizen of the United States, residing at Michigan City, in the county of La Porte and State of Indiana, have invented certain new and useful Improvements in Looms for Weaving Cane, which are fully set forth in the following specification, reference being had to the accompanying drawings, in which—

Figure 1:
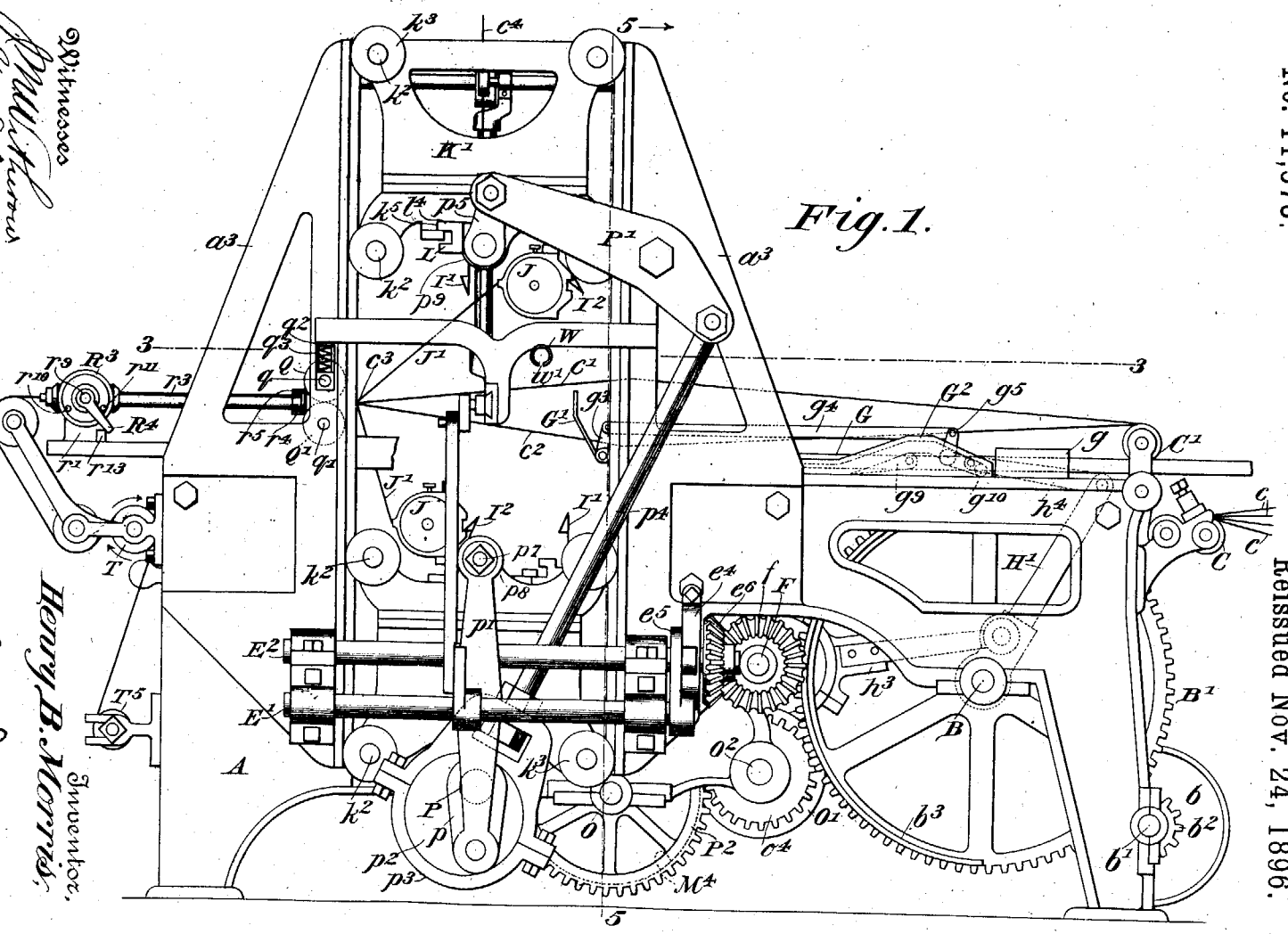
Figure 2:
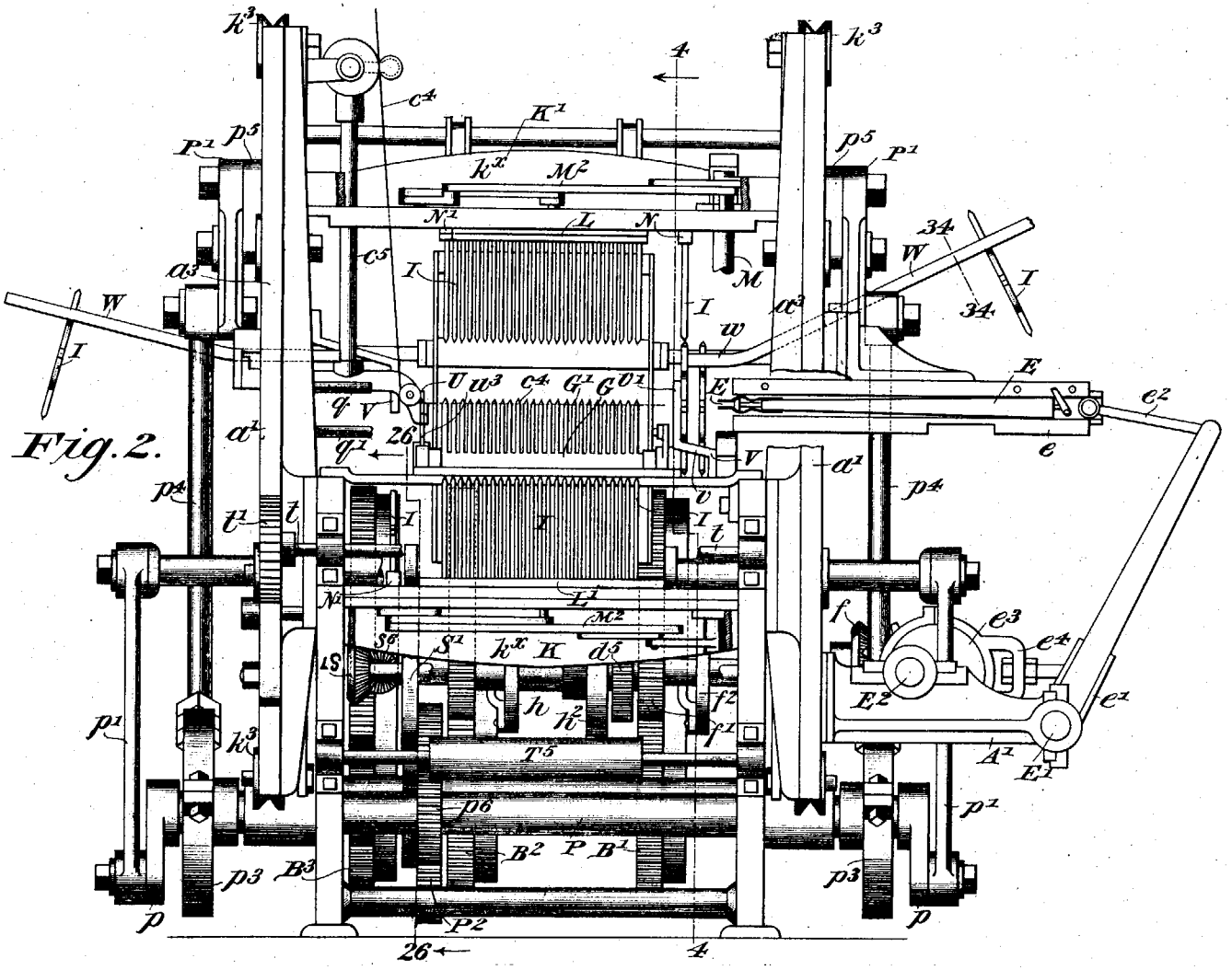
Figure 3:
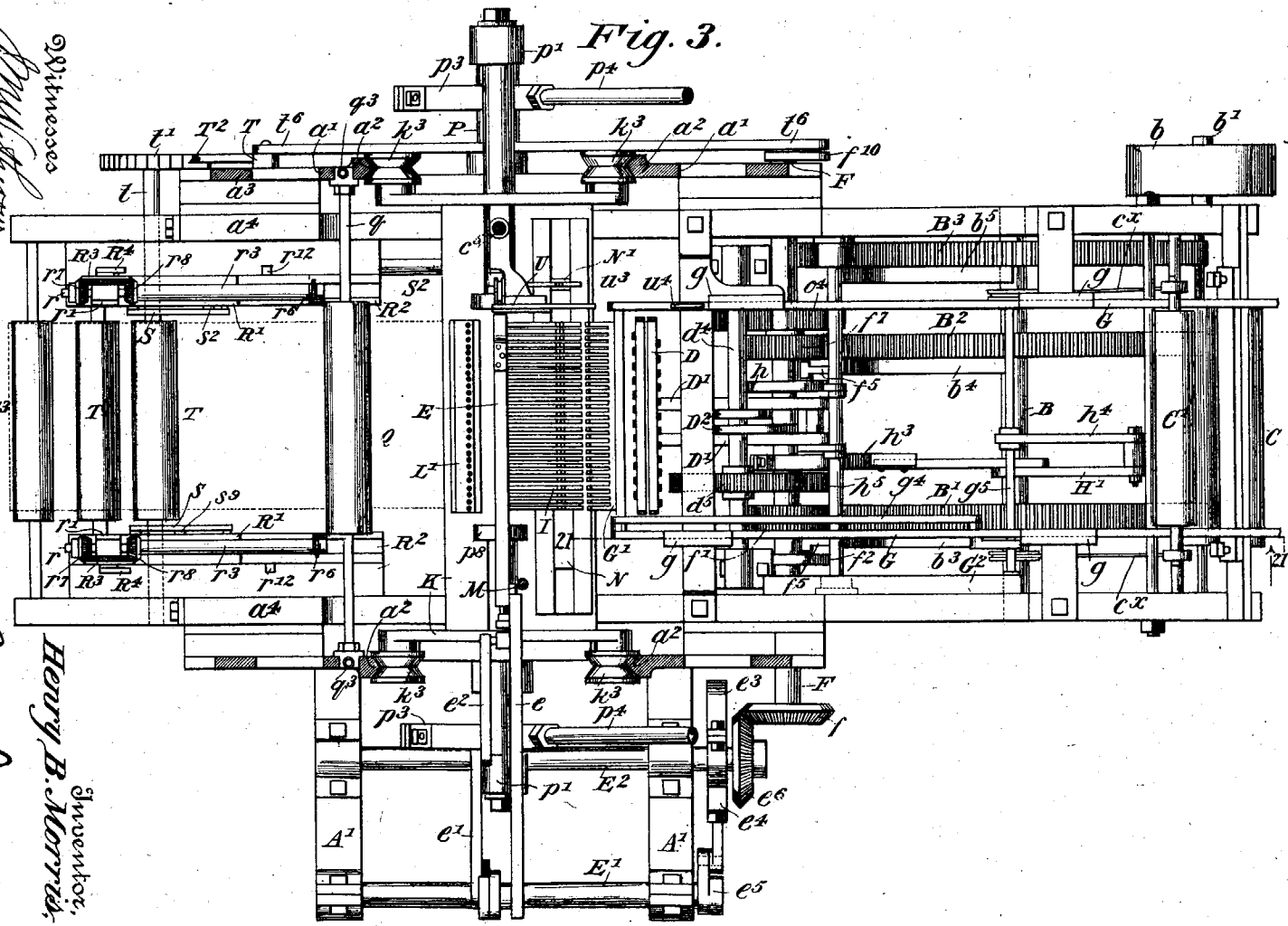
Figure 4:
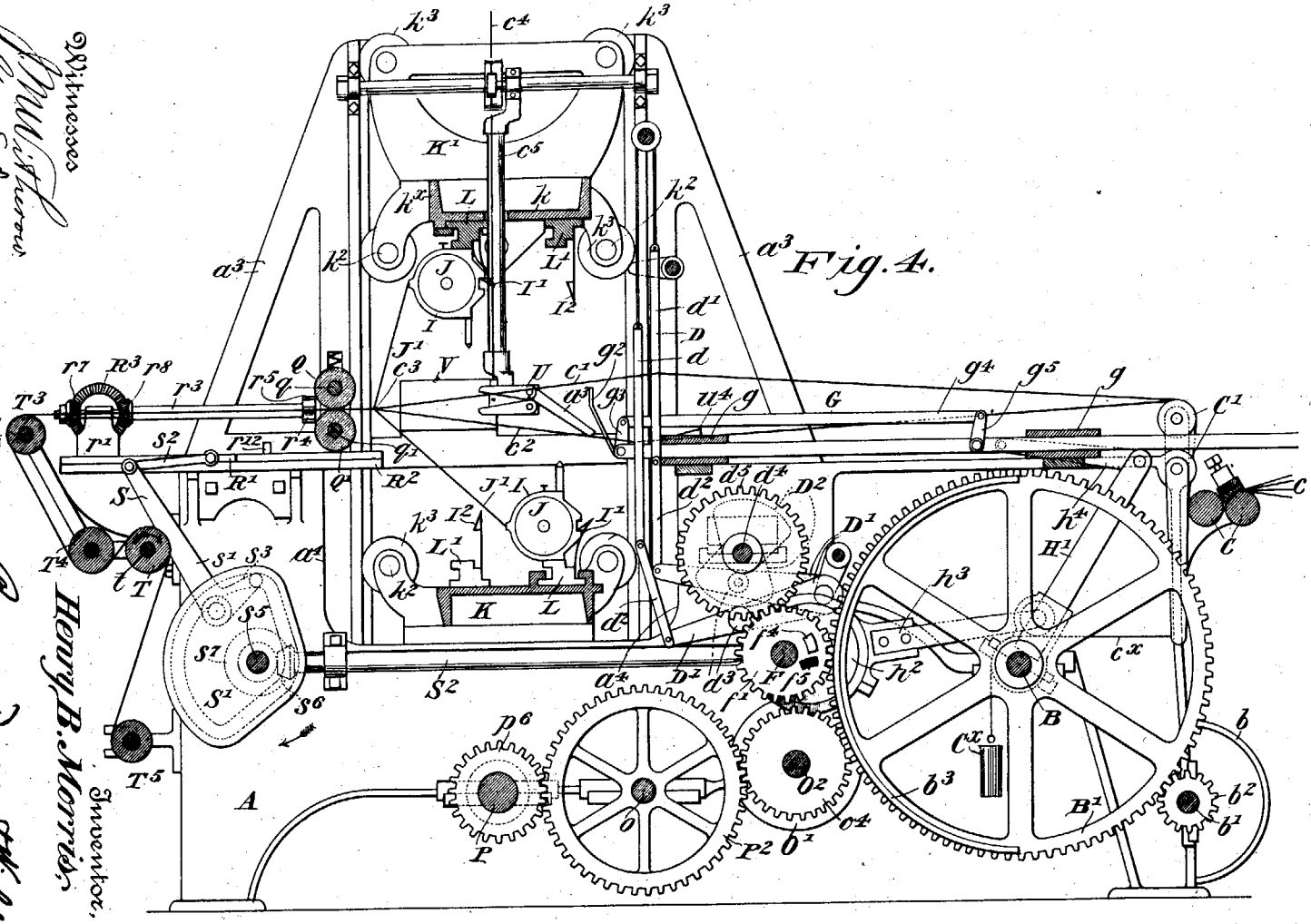
Figure 5:
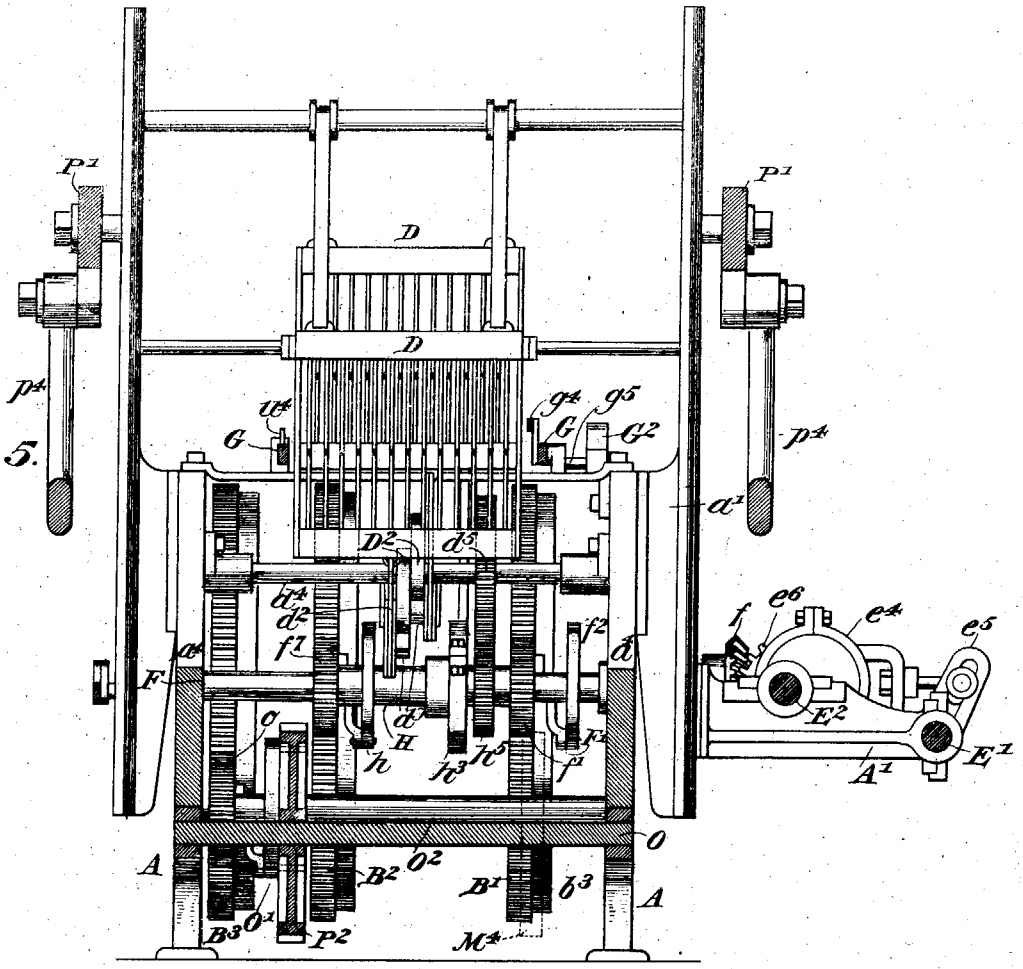
Figure 6:
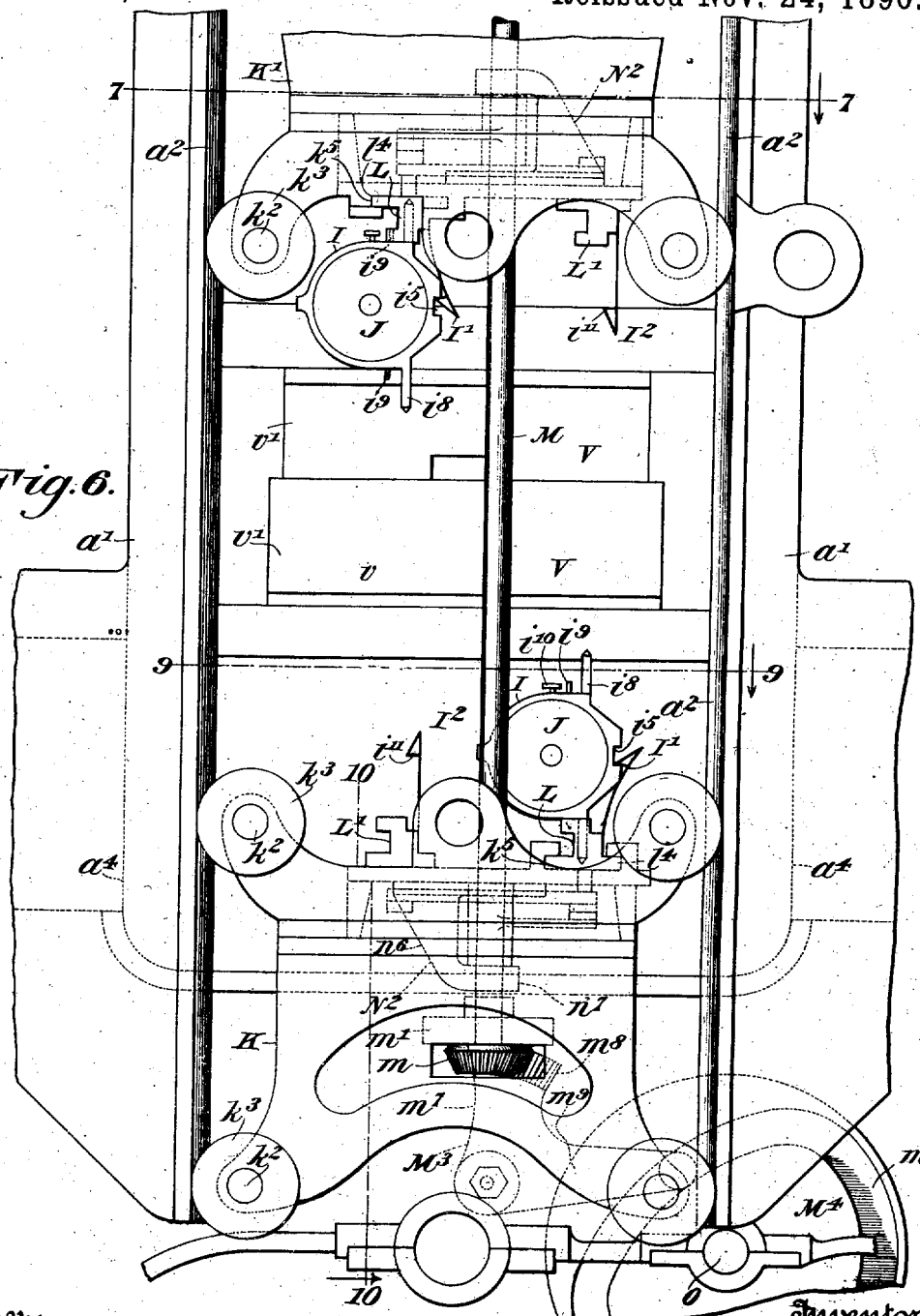
Figure 12:
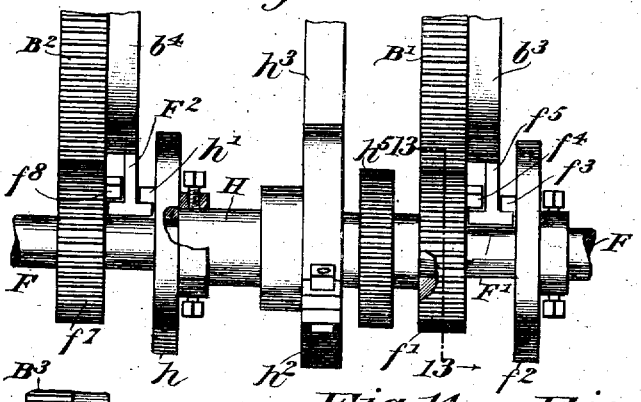
Figure 13:
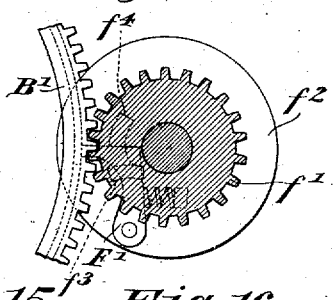
Figure 14:
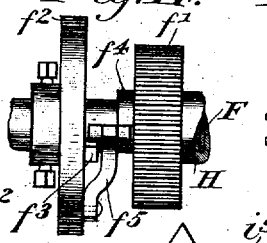
Figure 15:
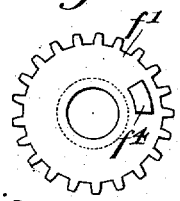
Figure 16:
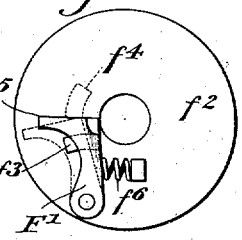
Figure 17:
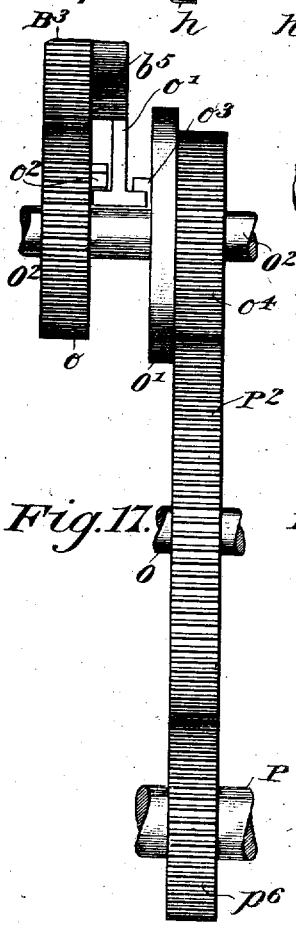
Figure 18:
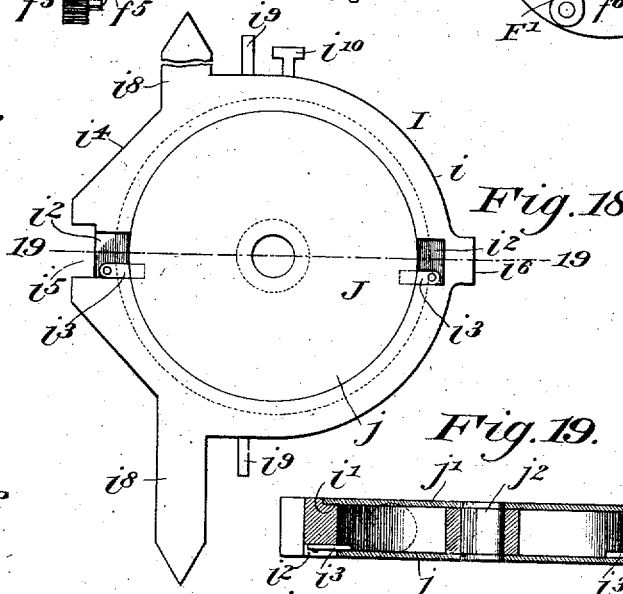
Figure 19:
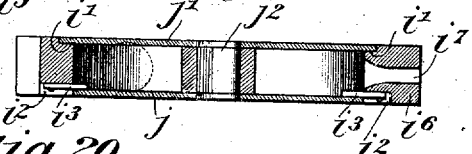
Figure 20:
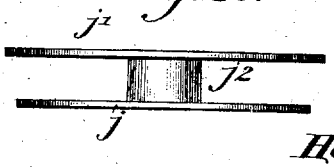
Figure 21:
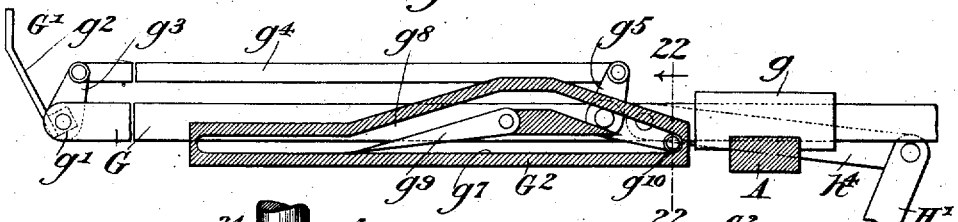
Figure 22:
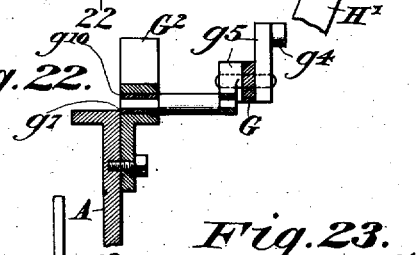
Figure 24:
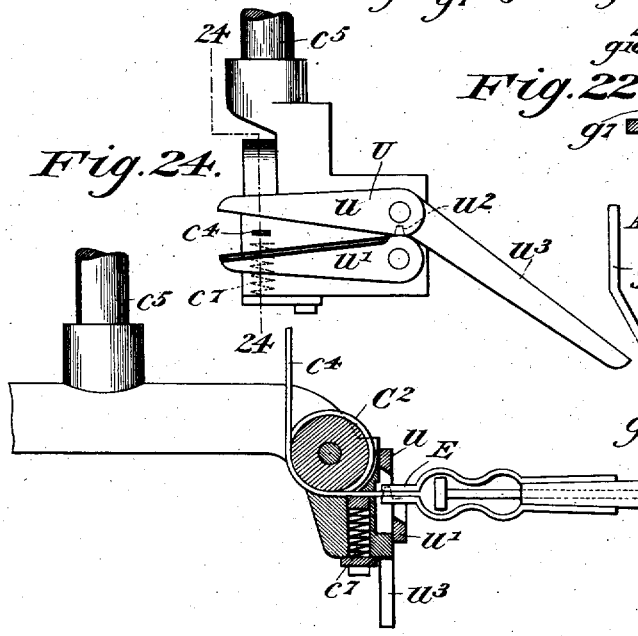
Figure 23:
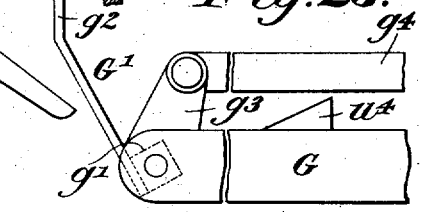
Figure 25:
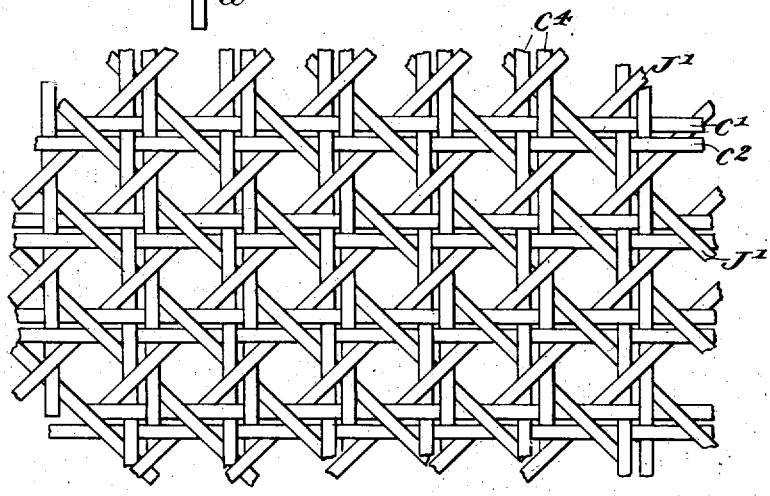

Figure 1 represents a side elevation of a loom embodying my invention; Fig. 2, a front end elevation of the same with some of the parts broken away; Fig. 3, a plan of the same with the upright portion rising from the bed of the machine cut away in section on the line 3 3 of Fig. 1; Fig. 4, a vertical longitudinal section of the same, taken on the line 4 4 of Fig. 2; Fig. 5, a vertical cross-section taken on the line 5 5 of Fig. 1; Fig. 6, a detail side elevation of the same, showing the shuttle-slides and shifting devices; Fig. 7, a detail plan section taken on the line 7 7 of Fig. 6; Fig. 8, a detail vertical section taken on the line 8 8 of Fig. 7; Fig. 9, a detail plan section taken on the line 9 9 of Fig. 6 with the bobbins and some of the other devices omitted; Fig. 10, a detail vertical section taken on the line 10 10 of Fig. 6; Fig. 11, a detail vertical section taken on the line 11 11 of Fig. 7; Fig. 12, a detail plan of the main loom-shaft and its attachments detached from the machine; Fig. 13, a detail section taken on the line 13 13 of Fig. 12; Fig. 14, a detail plan of Fig. 13, showing the clutch device; Fig. 15, a side elevation of the clutch-pinion detached; Fig. 16, a similar elevation of the clutch-disk detached from said shaft; Fig. 17, a detail plan of the shaft driving the diagonal-weaving mechanism and its connecting-gearing detached from the machine; Fig. 18, a detail inner end elevation of one of the shuttles with a bobbin in place; Fig. 19, a plan section of the same, taken on the line 19 19 of Fig. 18; Fig. 20, a plan of one of the bobbins detached; Fig. 21, a detail vertical section taken on the line 21 21 of Fig. 3; Fig. 22, a detail cross-section of the same, taken on the line 22 22 of Fig. 21; Fig. 23, a detail elevation of the cutter and its operating device; Fig. 24, a detail elevation and section on the broken line 24 24 of Fig. 23; Fig. 25, a detail plan showing a section of open-woven cane as completed on this machine; Fig. 26, a detail vertical section taken on the line 26 26 of Fig. 2; Fig. 27, an end elevation of a bobbin and shuttle with the end of the cane strip protruding; Fig. 28, a detail transverse section on the broken line 28 28 of Fig. 26; Fig. 29, a detail vertical section on the line 29 29 of Fig. 28; Fig. 30, a detail plan showing a portion of a shuttle and the outer end of the diagonal strip-feeding device; Fig. 31, a detail section on the line 31 31 of Fig. 30; Fig. 32, a detail section on the line 32 32 of Fig. 30, taken after the feed-clamp has left the shuttles and closed upon the cane strand; Fig. 33, a rear side elevation of the feed-clamp shown in Figs. 30 and 31; and Fig. 34, a detail section on the line 34 34 of Fig. 2, showing the device for feeding the shuttles into the machine.

In the drawings, Figs. 1 to 5, inclusive, are upon one and the same scale. Figs. 6 to 17, inclusive, Figs. 21 and 22, and Figs. 26 to 29, inclusive, are upon one and the same scale, but enlarged from the former; and Figs. 18 to 20, inclusive, and Figs. 23 and 24 and Figs. 30 to 34, inclusive, are upon another and still more enlarged scale, and Fig. 25 upon a scale by itself nearly full size in the original drawing.

My invention relates to an open-cane-weaving machine in which the entire work required to produce the finished product is performed by one machine. Heretofore this work has been done by two separate operations, and where both were performed by machines two separate and independent machines have been employed. In the first operation a machine has been used which simply did plain weaving, thereby producing what is generally known in this art as the "mat." The second operation has been the insertion or weaving in of the diagonal strands into this mat, and this operation has been performed either by hand or by a separate and independent machine, to which the woven web or product of the first machine is transferred.

The object of my present invention is to provide a single machine which will perform both of these operations, so that the finish open-woven cane fabric as it is made to chair-seats and other like purposes is produced entirely by the operation of a single machine. In other words, I combine the plain-weaving machine and the diagonal-weaving machine in a single structure, which produces the completed fabric referred to from the cane strips or strands without transfer from one machine to another.

I will now describe in detail the construction and operation of a complete machine embodying my invention; but the machine so far as the mechanism for accomplishing the plain weaving or production of the mat is concerned is the same as in the mat-weaving machines well known and in common use, and therefore a detailed description of this mechanism will not be necessary and only a general reference to this part of the machine will be made, except where modifications have been required in the application of the new and additional mechanism for inserting the diagonal strips.

The improvements which I believe to be new, and desire to secure by Letters Patent, will be designated more particularly in the claims following the description.

In the drawings, A represents the main or supporting frame, which, as shown in the drawings, is an upright rectangular structure of considerably greater length than width. The main shaft B is mounted in this frame transversely and at the rear end thereof, and on this shaft are fixed three large gear-wheels B′, $B^2$, and $B^3$, which impart the required movements to the several mechanisms of the machine by their rotation with the main shaft. The main shaft is driven from any suitable source of power and by any suitable device, these being shown in the drawings as a driving-pulley $b$, the shaft $b'$ of which is mounted on the main frame and is provided with a fixed pinion $b^2$, arranged to engage with the gear-wheel B′, as seen in Figs. 1 and 4. The pulley is driven from any suitable source of power. At the rear end of the frame there are also mounted two sets or pairs of rollers C and C′, the first horizontal and the second vertical in arrangement, over which the warp-strips $c$ are carried into the machine. The rollers C′ are mounted on a hinged frame, to which is connected by cords $c^\times$ a weight $C^\times$, which serves to impart a tension to the warp-threads which traverse the rollers.

About midway of the length of the main frame the harness D is arranged, the heddles $d$ $d'$ of which are operated in the usual way to form the usual shed between the alternately raised and lowered warp-strips $c'$ $c^2$, as seen in Figs. 1 and 4, the weaving-line being indicated by $c^3$ in Fig. 1. The usual alternating reciprocation is given to the heddles by means of levers D′, pivoted at one end to suitable supports on the frame and at their other ends connected by link-rods $d^2$ to the respective heddles. These levers are provided with side pins carrying antifriction-rollers $d^3$, which are acted upon by cams $D^2$ on opposite sides of a transverse shaft $d^4$, on which is fixed a gear-wheel $d^5$. This gear-wheel is rotated at intervals to operate the heddles by mechanism which will be described presently.

The warp is carried through the machine by a feed mechanism operating intermittingly to give a step-by-step movement to the warp and finished fabric, as will be described later on.

The meeting or weaving point—that is, the point to which the filling is brought by the beater in the ordinary operation of weaving—is indicated by the letter $c^3$ in Figs. 1 and 4 of the drawings.

The strands $c^4$ for the weft or filling are drawn transversely across the warp through the shed therein in pairs by a picker E, which is shown in Fig. 24. This device and the feeding parts in connection with which it operates (seen in Fig. 24) are well known and require no special description here. The picker is mounted in a horizontal guide $e$, in which it slides back and forth, this guide being fastened horizontally to one side of the frame from which it projects, as seen in Fig. 2. The picker is reciprocated by a rock-shaft E′, mounted in a supplementary frame A′, projecting out at one side of the main frame near the bottom thereof. A lever-arm $e'$ is fastened at one end to this rock-shaft, and at its upper end is connected by a link-rod $e^2$ with the outer end of the picker, so that the oscillation of this shaft will obviously reciprocate the picker. A second shaft $E^2$ is mounted in the same frame inside the former shaft and parallel therewith. On this latter shaft is an eccentric $e^3$, and the eccentric-strap $e^4$, applied thereto, is connected to a crank-arm $e^5$, fastened to one end of the said rock-shaft. On the corresponding end of the shaft $E^2$ there is a bevel-pinion $e^6$, whereby the said shaft is driven by the rotation of a shaft F, mounted transversely of the main frame and projecting beyond the latter on the side of the supplementary frame A′, being provided at this end with a bevel-gear $f$, engaging with the gear $e^6$, whereby whenever the shaft F is rotated a corresponding rotation is given to the shaft $E^2$, thereby oscillating the shaft E′ and so reciprocating the picker.

An intermittent rotary movement is given to the shaft F from the driving-gear B′ on the main shaft in the following way: This drive-wheel is provided on its outer face with an annular rim or flange $b^3$, arranged just within the teeth of the said wheel and extending half-way around the latter, as seen in Fig. 4. A gear-pinion $f'$ is mounted loosely on the shaft F and is arranged to engage with the drive-wheel B′. A little outside of this pinion there is secured to the shaft a disk $f^2$, provided on its inner face with a projecting lug $f^3$, located close to the shaft. On the face of the pinion opposite to this disk there is also a projecting stud $f^4$, which, however, stands away from the shaft, so as to leave an open space between the two, as seen in Fig. 12. A pawl F′ is pivoted at one end to the inner face of this disk near the outer edge thereof, whence it extends inward to the shaft, being constructed at its outer end with a T-head $f^5$, the cross-arm of the T being next to the shaft, while the long arm extends outward to the rim-flange on the side of the drive-wheel B′. The cross-arm of the T is of a length about sufficient to fill the space between the loose pinion and the fixed disk on the shaft F, and hence when in line with the lugs on the pinion and disk will connect the pinion to the disk, thereby rotating the shaft by the rotation of the pinion. This engagement is effected when the pawl is turned outward on its pivot, so as to bring the inner end of the T-head in the path of the lug on the pinion, in which adjustment it is held by a spring $f^6$, fastened at one end to a projection on the disk and at the other to the pawl. When, however, the pawl is turned inward to the shaft, this inner projection of the T-head will register with the free space between the lug on the pinion and the said shaft, though still retaining its register with the lug on the disk, as seen in Fig. 12. Now this space is sufficiently wide to permit the lug to pass through freely, so that when the pawl is in this adjustment the pinion rotates loosely on the shaft without moving the latter. The pawl is held in this inward adjustment by contact of the rim-flange on the side of the drive-wheel B′, which presses it inward, as seen in said Fig. 12; but as soon as the rim passes from the pawl it is immediately thrown outward by the operation of its spring, and the lug on the pinion will then make contact therewith, when at once rotation is communicated to the shaft, the T-head being always in contact with the lug on the disk. It will be seen from this description that during one half of each revolution of the drive-wheel B′ the shaft F will be stationary, while during the other half of said revolution it will be rotated by the connection described, and during each revolution of the said drive-wheel the picker will therefore be operated one half the time and remain at rest the other half. This results from the fact that the rim-flange on the wheel B′ extends half-way around said wheel, and as the pawl or clutch device is held out of engagement with the shaft F while in contact with this rim-flange the said shaft F will remain at rest during this period, which is one-half the revolution of the wheel B′, and of course during the other half-revolution of the said wheel the clutch device will normally engage with the shaft F, so that the latter will be also rotated during the same period. Now this shaft F operates the picker mechanism, as already described, so that the said mechanism will have periods of action and rest corresponding with those of the shaft—that is, during one-half the revolution of the wheel B′ the picker mechanism will be operated and during the other half-revolution it will stand at rest. The relation of these devices is such, however, that each half-revolution of the wheel B′ will impart two revolutions to the shaft F when these parts are engaged by the clutch mechanism. Further, each revolution of the shaft F produces one complete operation of the picker—that is, a full reciprocation across the machine and back again. Two revolutions of the shaft F will therefore produce two full reciprocations or movements of the picker and so draw in two strands of filling. Obviously, then, during one half-revolution of the wheel B′ the picker will make two full reciprocations and draw in two filling-strands, while during the other half-revolution of said wheel when the rim-flange is in engagement with the clutch mechanism the shaft F will stand at rest, and of course the picker mechanism which it drives will also be in a state of rest.

The beater is of somewhat peculiar construction, as well as the mechanism by which it is operated. For the beater I provide a long rectangular frame G, the side bars of which are mounted in guideways $g$ on the main frame, in which this beater-frame is free to slide back and forth horizontally lengthwise of the machine. The beater G′ is mounted by pivotal supports at the inner end of this sliding frame. It is composed of a cross-bar $g'$, journaled in the ends of the side bars and carrying beater-arms $g^2$, fixed thereon and projecting upward therefrom, being first inclined forward, as well as upward, and then terminating in a straight vertical tip, as seen in Figs. 4, 21, and 23. These beater-arms are arranged at suitable intervals corresponding with the warp-strands, and in working position extend up between the latter, so that the vertical tips will be on the weaving-line. When the beater-frame is moved forward to beat up the weft, the beater-arms must of course be in the upright position, (seen in Figs. 4 and 23;) but in the return movement it is necessary that they be depressed, for in the operation of the machine the picker is then moving across the warp and will be in the path of the retreating beater-arms if they are held upright. The support of these arms is therefore pivoted in the frame, as already described, and to this support or bar there is secured a short crank-arm $g^3$, connected by a link-rod $g^4$ back to one arm of a bell-crank lever $g^5$, pivoted to one of the side bars of the sliding frame, the other end of which is provided with a roller-pin $g^{10}$, running in a cam-guide $G^2$, fixed on the main frame. This cam-guide is provided with one straight horizontal groove or path $g^7$, running along the bottom thereof, and a second broken path $g^8$, rising on an incline from the former about a third of the way back from its inner end, and then running horizontally a little distance and then inclining downward to the rear end of the lower groove, as seen in Fig. 21. A switch $g^9$ is pivoted to the bridge between the two grooves with its point extending forward, as seen in Fig. 1, and is free to rise and fall on its pivot. When the sliding frame is moved to beat up the weft, the roller-pin $g^{10}$ on the bell-crank passes along the lower groove and out underneath the pivoted switch, in which travel the beater-arms are held upright in working position, but on the return movement the roller-pin will pass up on the incline of the switch, and so follow the upper groove, which travel will obviously rock the bell-crank in a direction to throw the beater-arms downward, so that they can pass under the picker, and at the end of the movement throw them up again into working position.

The following is the mechanism for operating the beater sliding frame: A sleeve H is mounted loosely on the shaft F just inside the loose pinion $f'$ thereon, and extending thence along the shaft nearly to the plane of the drive-wheel $B^2$, this latter gear being arranged to engage with a pinion $f^7$, mounted loosely on the shaft F. The sleeve H carries a disk $h$, fixed on the end thereof next to the said loose pinion $f^7$, and a clutch device is provided for connecting the said pinion with this disk identical with the device heretofore explained for connecting the loose pinion $f'$ with the disk $f^2$, and consisting of a side lug $h'$ on the disk, a side lug $f^8$ on the pinion, a T-headed spring-pawl $E^2$, pivoted to the disk, and a semicircular rim-flange $b^4$ on the inner face of the wheel $B^2$, arranged to act on said pawl. These parts are precisely the same and operate in precisely the same way as those just referred to and fully described above, so that the description in detail need not be repeated here. The operation of the parts to connect and disconnect the said gear-pinion and disk on the sleeve will be readily understood from the description given of the similar devices near the other end of the shaft. On this sleeve H there is fixed an eccentric $h^2$, to which is applied an eccentric-strap and connecting-rod $h^3$, the other end of which is hinged to a lever-arm H', mounted loosely on the driving-shaft B, the connection just mentioned being a short distance above the said shaft, as seen in Fig. 4. The upper end of this lever is connected by a link-rod $h^4$ with the rearward end of the sliding beater-frame; and by this connection it is obvious that the said frame will be reciprocated by the action of the cam on the sleeve whenever the latter is rotated. On this same sleeve there is also fixed a gear-pinion $h^5$ near the outer end thereof, which is arranged to engage with the gear-wheel $d^5$, heretofore mentioned, and thereby rotates the cam-shaft $d^4$ to operate the harness, as heretofore described, whenever the sleeve is rotated, which motion is of course independent of any movement of the shaft F, on which the sleeve is mounted.

Obviously the proper and suitably-timed operation of the mechanisms thus far described will result in weaving an ordinary open cane mat.

I will now describe the mechanism by means of which the diagonal strands are also inserted or woven in with the warp and woof, so that with the finishing action of the beater a completed fabric will be produced. I provide shuttles I, which are designed to carry the bobbins J, on each of which is wound a cane strip intended for a single diagonal strand, but of a little greater length than actually required for such strand in the finished fabric. These shuttles are made of substantially circular form, though the outer rim $i$ is not perfectly circular in contour, while its inner face does form a complete circle. On one side of this inner rim there is a shallow rabbet $i'$, at the inner edge thereof, as seen in Fig. 19, and on the opposite side there are cut two recesses or transverse grooves $i^2$, within which are pivoted short buttons $i^3$, diametrically opposite to each other. At what may be called the "rear edge" of the shuttle there is a slight enlargement or projection outward $i^4$, in which is cut a square notch $i^5$. At the opposite or front edge of the shuttle there is a small rectangular projection or nose $i^6$, through which there extends a horizontal aperture $i^7$. Near the rear edge of the shuttle there are also round projecting pins $i^8$, extending both upward and downward from the rim, and which serve as fastening pins or pivots by which the shuttles are secured in their holders or frames, as will be described presently. Just in front of these pins there are much smaller and shorter pins $i^9$, which serve as centering devices to the shuttles in their holders to prevent them from turning on the former pins, as will also be described presently. On the upper end or side of the shuttle-rim there is also a small short T-headed pin $i^{10}$, standing just a little in front of the pin $i^9$, as seen in Fig. 18. The bobbin consists of two circular disks $j$ $j'$, secured to a short hollow hub $j^2$, leaving a narrow space between them for the accommodation of the cane strip which is wound upon the hub. The former of these disks is of the same size as the interior of the shuttle-rim, so as to fit the same and easily pass through it; but the latter disk $j'$ is a little larger and will not pass through the shuttle, but its outer edge will rest in the rabbet $i'$, which forms a seat for this disk at one side of the shuttle. The bobbin is inserted in the shuttle by passing the smaller disk through until the larger disk is thus seated, and then is secured in place by turning the buttons $i^3$ inward inside of the said disk $i$, as seen in Figs. 18 and 19. As already stated, a cane strip J' is wound upon each bobbin, and when the latter is placed in the shuttle the outer end of this strip is thrust out through the aperture $i^7$ in the front edge of the shuttle and pulled through sufficiently to leave a short projecting end $j^3$ hanging outside of the shuttle, as seen in Figs. 26 and 27.

The mechanism for receiving, holding, and manipulating the shuttles for weaving in the diagonal strands will now be described. On each side of the main frame A, about midway thereof, there are two upright standards or posts $a'$, extending from near the bottom of the frame to a considerable distance above the bed of the latter, as seen in Figs. 2 and 6. The two standards on one side of the machine stand in the same plane and parallel to each other, with quite a space between them, and having their inner edges $a^2$ V-shaped, as seen in Figs. 3 and 6, thus providing vertical guideways. The standards are not connected together at their upper ends, but are stiffened and supported by inclined side braces $a^3$, connecting the horizontal portion of the main frame with these standards, as seen in Figs. 1 and 26. The side pieces $a^4$ of the main frame are also cut out quite a way down between these standards, as seen in Figs. 4, 5, and 6, and to the depth of these recesses there is a free open space across the machine for the distance between the front and rear standards. In this transverse space are mounted two carriages K and K', one above the other, and in the drawings the former letter is used to indicate the lower and the latter letter K' to indicate the upper carriage. The main portion of each carriage is a straight horizontal bed-piece $k$, having vertical flanges $k^{\times}$, and which is of a length to reach across the machine in the space between the standards and nearly from one pair to the other of said standards. At each end of this bed-piece there is a substantially rectangular end piece $k'$, provided with outwardly-projecting journal-pins $k^2$ at each corner, on which are mounted rollers $k^3$, and the proportions of these end pieces are such that the said rollers will just fit the guideways on the inside of the standards, the rollers being grooved to correspond to the V shape of the guides, as seen in Figs. 3, 6, and 7. It will thus be seen that provision is made for the free travel of these carriages vertically in the space between the standards, and that they are held in position and guided during this travel by the said standards. In the operation of the machine it is designed that these carriages shall travel vertically to and from each other, for purposes which will presently be described, together with the devices by which this travel is effected.

Shuttle-holders L and L' are mounted on the front or inner faces of both bed-pieces $k$, so that they will be carried by the carriages as they move back and forth to and from each other. From the description above it will be understood that the front face of the lower bed will be the upper side thereof, while that of the upper bed will be the under side thereof. The shuttle-holders are movable and stationary, the former being indicated by the letter L and the latter by the letter L' and the movement of the former being in the direction of their length and lengthwise of the respective beds. These holders are arranged alternately on the respective beds, as seen in Figs. 4 and 6, in which on the upper bed the sliding holder L is shown mounted near the front edge of the bed and the stationary holder L' at the rear edge thereof, and on the lower bed these positions are reversed, the stationary holder L' being located near the front edge of the bed and the sliding holder L at the rear edge thereof. One of these sliding holders, with its corresponding fixed holder, constitutes a coöperating pair of shuttle-holders, the action of which is to weave in or insert one of the diagonal strands, while the other pair operates in a similar manner to insert the other diagonal strand, running, as usual, in the opposite direction to the former and at right angles thereto. The sliding holders L are provided with a series of small round sockets $l$, sitting in from their faces and extending the length thereof, and just in front of this row of sockets is another row of much smaller holes or sockets $l'$, as seen in Figs. 9 and 11. The stationary holders L' are also provided with similar sockets $l^2$ and $l^3$, the former being the larger and the latter the smaller holes. These sockets are intended and adapted for the reception of the respective pins $i^8$ and $i^9$ on the respective ends of the shuttles, the larger sockets being adapted to receive the larger pins $i^8$ and the smaller sockets the smaller pins $i^9$. The shuttle-holders are arranged about directly opposite to each other on the respective bed-pieces, as seen in Figs. 7, 9, and 26, and the stationary holders L' are secured to the bed-pieces in any ordinary suitable way. The sliding holders L are mounted in ways $k^4$ on the faces of the respective bed-pieces and running lengthwise thereof. The sliding holders are substantially T-headed in cross-section, the back of each being extended laterally to form a flange along each side of the holder, thus forming the head $l^4$ of the T, which fits side grooves $k^5$ in the sides of the guideways, as seen in Figs. 6 and 11. Obviously these holders are thus connected to the respective bed-pieces, so as to be carried by them, while at the same time they are free to slide lengthwise thereof.

The mechanism for giving a reciprocating sliding movement to the movable holders is illustrated in Figs. 7 to 11, inclusive. In each of the bed-pieces, about midway of their length and over the respective guideways, there is provided a short longitudinal slot $k^6$, through which a pin $l^5$ on the backs of the respective holders projects, and the short arm of a lever $L^2$ is pivotally connected to these pins, the levers themselves being mounted on the backs of the respective bed-pieces by pivotal connections $l^6$ and arranged transversely of the beds, as seen in Figs. 7 and 9, the former of which shows the back of the upper bed-piece and the latter the front of the lower bed-piece, so that together they fully illustrate the front and back of the bed-pieces. From the description of the relative arrangement of the sliding and stationary shuttle-holders given above it will be evident that the position of these levers so far as the arms are concerned will be reversed, the short arm on the upper bed-piece standing in one direction, while that on the lower bed-piece stands in the opposite direction, as seen in Figs. 7 and 9. These levers are vibrated on their pivots by means of an oscillating or rock shaft M, standing vertically at one side of the machine and provided at its lower end with a bevel-pinion $m$, by means of which an oscillating movement is communicated to the shaft through mechanism which will be described presently. This shaft passes up by the side of the machine, as seen in Fig. 6, being mounted in suitable bearings at its lower and upper ends. The lower bearing $m'$ is in a bracket fixed on the side of the main frame, as seen in Fig. 10, while the upper bearing is in a bracket $N^2$, fixed on the upper carriage, as seen in Fig. 6, and is free to slide on the shaft as the said carriage moves up and down. At the back of each bed-piece is a sleeve M', mounted on this shaft and secured thereto by spline and groove, so that it will be oscillated with the shaft, but at the same time is free to slide back and forth thereon. Each sleeve is provided with a short projecting crank-arm $m^3$, connected by a short link-rod $m^4$ to a long connecting-rod $M^2$, extending lengthwise of the bed parallel with and a little distance from the respective sliding shuttle-holders and nearly the length of the bed. The opposite end of this connecting-rod is hinged to the long arm of a lever $m^5$, pivoted to the back of each bed and substantially parallel with the lever $L^2$ and having its short arm connected to the long arm of the said actuating-lever $L^2$ by a suitable link $m^6$. It will be seen from this arrangement that the oscillation of the upright shaft will communicate a reciprocating movement to each connecting-rod $M^2$, which in turn vibrates the lever $m^5$ and through it the actuating-lever $L^2$; but the throw of the latter will be much less than that of the former, because of the arrangement of the connecting-arms described above. This movement will obviously give a short reciprocation to the sliding shuttle-holders, and the parts are so constructed and arranged relatively that the movement is a step equal to the distance between the axial centers of the shuttle-sockets in the said holders. At the end of each bed-piece, next to the upright shaft M, there is a short block N, which is mounted in the same guideway as the sliding shuttle-holder, being constructed with lateral flanges for this purpose, the same as the said holder. The block is therefore adapted to slide back and forth in the said guideway, like the holder. It has an outwardly-extending arm $n$, which is connected to the corresponding end of the rod $M^2$ by means of a pin $n'$, which passes up through a slot $k^7$ in the bed-piece. This block is provided with sockets $n^2$ and $n^3$, corresponding, respectively, to the shuttle-sockets $l$ $l'$ in the shuttle-holder and for the same purpose. At the opposite end of each bed there is a similar block N', also mounted in the guideway in the same way and provided with an outer arm $n^4$, by which it is connected with the outer end of the rod $M^2$ by a similar pin $n^5$, passing up through a slot $k^8$ in the bed. This block is also provided with sockets $n^2$ $n^3$, exactly the same as in the block N and for the same purpose. These blocks are practically sections of the sliding holder, so that if either is moved up against the adjacent end of the holder it becomes practically a part thereof. It will be noticed that these blocks are connected to the respective ends of the reciprocating rods $M^2$, so that they receive the full motion of the latter, while the sliding holders receive only a part of this motion, owing to the manner of connecting up the levers described above. This gives a much greater range of sliding movement to the respective blocks than to the corresponding sliding holders, for a purpose which will appear presently. As already stated, the sleeves M' are free to slide on the shaft M, and at the same time they are held to the respective beds by devices which firmly secure them to the beds and at the same time permit them to be moved therewith by sliding on the shaft. The device used for this purpose on each bed is a bracket $N^2$, which is secured by means of a foot to the outside of each bed, as seen in Figs. 6, 7, and 9. From this foot rises a vertical standard $n^6$, which at its upper end is bent inward to form a short horizontal extension $n^7$, this horizontal section extending inward to the line of the oscillating shaft and being perforated to permit the shaft to pass through it. The space between this horizontal projection and the back of the plate is just sufficient to receive one of the sleeves, so that when the parts are properly organized the sleeve will be held to the bed by the bracket and secured in position by the shaft passing up through the bed, sleeve, and bracket, as seen in Fig. 6. Obviously in putting these parts together the bracket must be bolted to the bed, the sleeve then put in position, and the shaft then thrust in through the apertures prepared for it in these several parts, when they will appear organized, as seen in Figs. 6 and 8. As already stated above, this bracket $N^2$ on the upper carriage also forms the upper bearing for the shaft M.

The oscillation of the upright shaft is effected by the following devices: As already stated, this shaft carries at its lower end a bevel-pinion $m$. A bell-crank $M^3$ is mounted loosely on a pivot-pin secured to the lower portion of the main frame and extending inward underneath the said pinion. One arm, $m^7$, on this crank is substantially upright and is provided with a toothed segment $m^8$, which engages with the bevel-pinion $m$. The other arm, $m^9$, of this bell-crank is nearly horizontal and is provided with a roller-pin at its extremity, which enters a groove in a cam $M^4$, as seen in Fig. 6, in which the cam-groove is indicated by $m^{10}$. Rotation is given to this cam at the proper time by the following mechanism: The cam is fixed on a transverse shaft O, arranged below and to the front of the shaft F, as seen in Fig. 4. A second shaft $O^2$ is arranged directly underneath the shaft F, and a pinion $o^4$, fixed on the shaft $O^2$, engages with a gear-wheel $P^2$, double the size of the pinion and fixed on said shaft O. Upon this shaft there is also a loose pinion $o$, with which the gear-wheel $B^3$ on the main driving-shaft engages. There is also fixed on this shaft, a little inside of the pinion $o$, a disk O′, and there is a clutch device for connecting the loose pinion with the fixed disk similar to that already described in connection with the shaft F. On the inner face of the loose pinion there is a short projecting lug $o^2$, set in a little way from the shaft, so as to leave a narrow free space between the two, and on the opposite or outer face of the disk there is a similar lug $o^3$, projecting laterally toward the pinion and set in close to the disk. A pawl $o'$ is pivoted to the disk and provided with a spring, being in all respects like the pawls F′ and $F^2$, already described, and operating, in connection with the lugs on the pinion and disk, to connect and disconnect the two precisely the same as the said pawls, which operation has been fully explained above and therefore need not be repeated here. The pawl is operated by a semicircular flange $b^5$ on the inside of the driving-gear $B^3$, the operation and result in connecting and disconnecting the loose pinion and disk to start and stop the rotation of the shaft being precisely as already described in connection with the like flanges on the driving-gears B′ $B^2$. A series of spring-catches is provided for each of the shuttle-holders, the number of these catches corresponding to the number of shuttle-sockets in the holders. These catches are all alike in construction, but for the purpose of distinction those on the sliding holders are designated I′ and those on the stationary holders $I^2$. These catches consist of straight flat springs fastened to the back of the respective holders in a row corresponding to the sockets therein, a spring being arranged directly behind each socket. At their extremities they are provided with a kind of hook or catch $i^{11}$, which is the same on all, and, as seen in the drawings, is made with a straight engaging face perpendicular to the body of the spring, extending forward therefrom and beveled on its inner side, so as to bring the extremity to a point, as seen in Fig. 6, for instance, of the drawings. Normally these springs extend straight inward from the faces of the respective holders—that is, they extend toward each other, as seen in Fig. 6. Similar spring-catches $i^3$ and $i^4$ are applied to the blocks N and N′, respectively, their arrangement and purpose being precisely the same as that of those on the holders.

As stated above, the carriages K and K′ are intended to be reciprocated to and from each other in the vertical guide-frame within which they are mounted, and the mechanism for effecting this movement will now be described.

A shaft P is mounted in the lowest part of the main frame, running transversely thereof, located immediately below the carriages and extending beyond the main frame at each side thereof, as seen in Fig. 2. At each extremity of this shaft there is fixed a crank $p$, and these cranks are connected to the sides of the lower carriage by means of pitmen $p'$, pivotally connected with rods $p^7$, extending inwardly from the pitmen through bearings $p^8$ in the lower carriage K, so that the revolution of the shaft P will obviously give a vertical reciprocation to the lower carriage. Just inside of each crank there is also fixed on the said shaft an eccentric $p^2$, to which is applied an ordinary eccentric-strap $p^3$. Each strap is connected by a pitman $p^4$ with the short arm of a lever P′, pivoted to the upright guide-frame, as seen in Fig. 1, and both connected at the inner ends or extremities of their long arms by link-bars $p^5$ to the respective sides of the upper carriage, as seen in Figs. 1 and 2, suitable bearings $p^9$ being provided to receive shafts projecting from the link-bars $p^5$, so that the rotation of the shaft below will also impart a vertical reciprocation to the upper carriage by the vibration of the said levers. The shaft P is driven from the shaft $O^2$, which is provided with a fixed pinion $o^4$ just inside of the disk thereon, and this pinion engages with a large gear $P^2$, which in turn meshes with a pinion $p^6$, fixed on the shaft P, as seen in Figs. 1, 4, and 17. As already explained, the shaft $O^2$ is driven by the main gear-wheel $B^3$, so that through the gearing connection just described the shaft P is also ultimately driven by the said main wheel, which therefore becomes the ultimate driver of the reciprocating carriages. A pair of rollers Q Q′ is arranged just in front of the upright carriage-frame, and so just a little in front of the meeting or weaving line, as seen in Fig. 1. These rollers are fixed on plain shafts $q$ $q'$, which are mounted on suitable journal-bearings on the main frame, being arranged so that the contact-line of the rollers will be in about the same plane as the weaving-line. The rollers are set vertically one above the other, and the bearings of the upper-roller shaft $q$ are set in vertical slots $q^2$ in the upright frame, within which and above the bearings are set springs $q^3$, which normally hold the bearings of the upper roller down, so as to make something of a grip between it and the lower roller Q′. The woven fabric passes between these rollers just beyond the weaving-line, and is drawn through them by the regular take-up devices, the rollers rotating by frictional contact with the fabric, and thus facilitating the take-up movement. They are not feed-rollers, but rather gripping-rollers, which serve to stop and hold the web firmly just in front of the weaving-line.

In preparing for action the stationary shuttle-holders are filled with shuttles by hand, and the strands therefrom are drawn through the gripping-rollers Q Q′ by the attendant with the warp-strands, so as to be firmly held thereby. In the working action of the machine, however, the diagonal strand from each new shuttle is fed into working position by what may be called a "picker" or a "diagonal-strand picker," and this initial feeding mechanism will now be described. This diagonal-strand picker R is mounted just in front of the grip or stop rollers, at right angles thereto, one on each side of the machine and just outside of the respective ends of the said rollers.

The picker and its operative mechanism are precisely the same on each side of the machine with a single slight exception, which will be pointed out when reached in the description, and two are employed, so as to provide for the usual two diagonal strands, which are introduced one at one edge of the warp and the other at the opposite edge. A description of one will therefore be sufficient, except in the single particular referred to, and for this purpose the device at what has been called the "back" side of the machine will be taken. The picker itself is composed of a shaft $r$, which is mounted on an upright standard $r'$, rising from a slide R′, which is secured to a supporting-plate $R^2$, fastened to the inside of a main frame, as seen in Fig. 28, and running lengthwise thereof from the front end of the main frame backward underneath the shafts of the gripping-rollers and a little beyond the same, as seen in Fig. 3, the said rollers being only about the same in length as the width of the fabric, while their shafts extend outward on each side considerably beyond the ends of the rollers to bearings at the outside of the frame, as seen in Figs. 3 and 28. The table is provided with a guideway $r^2$ for the slide, which preferably is secured therein by a dovetail connection, as seen in Fig. 28, which holds the slide in place, while at the same time it permits it to move freely back and forth lengthwise of its support. The shaft $r$ is extended from its bearing-support toward the rear end of the machine, and there is mounted loosely upon it a sleeve-shaft $r^3$, running nearly the entire length of the shaft $r$—that is, at its outer or free end it terminates with the shaft, but at its other end it stops on the inside of the shaft-bearing, while the shaft $r$ itself passes back through the said bearing, as seen in Figs. 3 and 28. The inner ends of the two shafts carry the respective members or fingers of a gripping device, one of which, $r^5$, is secured to the solid shaft and the other, $r^4$, to the sleeve-shaft, as seen in Figs. 30 to 33. These fingers are straight thin arms arranged to extend directly inward at right angles to their respective shafts when closed together, and a circular bow-spring $r^6$ is fastened at its respective ends to the respective fingers, as seen in Fig. 31, and arranged to normally close the said fingers. The long shaft $r$ is provided with a bevel-pinion $r^7$, secured to the outer or standard end thereof and in front of its bearing-support, as seen in Figs. 3, 4, and 26. The sleeve-shaft is provided at its outer end with a similar bevel-pinion $r^8$, as also seen in Figs. 3, 4, and 26. A journal-pin $r^9$ is mounted in the upper end of the standard $r'$ and extends outwardly horizontally therefrom, as seen in Fig. 28, and on this pin is loosely mounted a bevel-gear $R^3$, which is arranged to engage with the respective pinions on the two shafts just described, and the outer face of this wheel is provided with two short outwardly-projecting pins or lugs $r^{10}$ $r^{11}$, arranged below the plane of the axis, the former at one side thereof corresponding to the pinion on the end of the solid shaft and the latter at the other side of said shaft corresponding with the pinion on the sleeve-shaft, as seen in Fig. 29. On the same journal-pin and outside of the gear-wheel there is also loosely mounted a swinging arm $R^4$, which depends from this journal, extending between the two pins on the outside of the bevel-gear. On the supporting-plate $R^2$ there are two upright lugs $r^{12}$ and $r^{13}$, standing in the path of the lower end of the swinging arm $R^4$, the former, $r^{12}$, being located about midway of the slide-support and the latter at the outer end thereof, as seen in Fig. 29. It is evident that the oscillation of the gear-wheel will rotate the two finger-shafts in opposite directions and that these oscillations will open and close the fingers, according to the direction of the movement. The oscillation of the gear-wheel is effected by the turning of the swinging arm against one or the other of the pins on the outside of the wheel by bringing the said arm into contact with one or the other of the lugs $r^{12}$ $r^{13}$ on the slide-support by the movement of the slide, as indicated in Figs. 28 and 29. The arrangement is such that when the slide R′ is advanced toward the shuttle I the swinging arm $R^4$ is at the end of said movement brought into contact with the lug $r^{12}$. The swinging arm is thereby caused to oscillate and is forced against the pin $r^{10}$ upon the beveled gear-wheel $R^3$. The continued movement of the slide results in a partial rotation of the beveled gear by reason of the contact of the arm $R^4$ with the pin $r^{10}$ and a consequent partial revolution of the shaft $r$ and sleeve-shaft $r^3$ through the medium of the beveled pinions $r^7$ and $r^8$. By the time that the slide has reached the end of its course the fingers $r^4$ $r^5$ will be closed, and being elastic they are in this position strained together closely; but a small object, such as a strand of cane or the end of a small portion of the shuttle from which said cane issues, may be held between them, straining them apart for a short distance. In closing they are assisted further by the spring $r^6$, attached to them, already described. Neither the fingers nor the spring are strong enough by their elasticity to overcome the frictional resistance of the gearing and to move it without assistance. Upon the retraction of the slide the fingers, already described, will remain closed until the slide has reached the opposite end of its course, when the swinging arm $R^4$ is brought into contact with the lug $r^{13}$, which forces the arm against the pin $r^{11}$ upon the beveled gear, and thereby, by the continued movement of the slide, causes the beveled gear to be oscillated to open the fingers. It will be understood that since one of the beveled pinions is attached to the sleeve and the other beveled pinion to the shaft, and that as the beveled pinions are engaged with opposite sides of the beveled gear, rotation of the bevel-gear in one direction necessarily results in rotation of the pinions, and therefore the sleeve and shaft, in opposite directions from one another. The fingers being attached, respectively, to the sleeve and shaft, must be moved in the same directions that the sleeve and shaft, respectively, are moved, which directions are opposite. Therefore the fingers are opened and closed by the alternate oscillation of the beveled gear. The swinging arm $R^4$ moves back and forth between the lugs $r^{12}$ and $r^{13}$, and is shifted in opposite directions by them to a sufficient extent to operate upon the pins $r^{10}$ and $r^{11}$ to actuate the beveled gear, but said arm does not ride over the tops of the lugs $r^{12}$ and $r^{13}$; but the lugs $r^{12}$ and $r^{13}$ are so disposed that at the end of the travel of the slide R′ in each direction the lug engaged with the swinging arm $R^4$ shall have moved said arm far enough to effect either the opening or closing of the fingers. The slide R′ travels no farther than enough to effect said opening or closing. Consequently the swinging arm $R^4$ never passes over or beyond the lugs $r^{12}$ and $r^{13}$, but is always between them. Now the position of the picker and the length of the fingers with reference to the gripping-rollers is such that when closed the fingers will reach in a little past the ends of the rollers, but when opened will stand outside of the ends thereof, so as to pass freely by them. When the fingers are closed at the end of their inward movement, as described, on their outward movement their closed ends pass through between the rollers, the fingers being thin and the upper roller yielding for this purpose.

It will be evident to any one familiar with the art of cane-weaving, from the drawings and from the above description, that during the reciprocation of the picker-slide R′ the two shafts to which the fingers are respectively attached must be at rest until just at the close of the respective reciprocations, for clearly the fingers must be closed all through one reciprocation, so as not to release the strand prematurely as it is pulled out; but just at the end of this movement, when the strand has been pulled between the rollers, it must be released by the opening of the fingers. During the opposite reciprocation of the slide the fingers should remain open, so as to pass outside the end of the rollers, as stated above, and also entirely out of contact with the newly-fed strand, until near the end of this reciprocation, when obviously the fingers must be again closed to take a new strand.

As already described, the oscillation of these finger-shafts is effected by the swinging of the arm $R^4$, which is loosely mounted on the pin $r^9$, so that it may turn thereon without moving the gear $R^3$ unless brought in contact with some stop thereon. The pins $r^{10}$ $r^{11}$ on the outer face of this gear are for this precise purpose, for, as described above, the loose swinging arm extends down between them, so that it must be evident that if this arm is moved in one direction until it comes in contact with one of said pins a further swinging movement in the same direction will then turn the gear $R^3$ until this swing of the arm ceases, and if the said arm is swung in the opposite direction until it is brought into contact with the other of the said pins the further swing of the arm in this direction will turn the gear in the same opposite direction until this swing of the arm is also stopped. During almost the entire reciprocating movements of the picker-slide the swinging arm must therefore remain at rest, and obviously the lugs $r^{12}$ $r^{13}$ are so arranged that the lower end of the swinging arm $R^4$, extending down between them, will travel back and forth in this free space in a state of rest; but the space between the said lugs is just a little shorter than the full travel of the picker-slide, so that a little before the end of each sliding movement of this device the depending end of the swinging arm will be brought in contact with one of said lugs, and the finishing movement of the slide will cause the arm to be turned against one of the pins on the gear $R^3$ and then impart a slight rotatory movement to said gear, just sufficient to close or open the picker-fingers, but no more; but the parts must be so arranged that this reciprocation of the picker-slide will cease before the end of the arm $R^4$ passes the stop-lug with which it has been brought in contact. As already described, the picker-slide then begins to move in the opposite direction, when, of course, the swinging arm drops a little until entirely free from the lug with which it has been in contact and then hangs in a state of rest while it is carried along through the open space between the said lugs until near the end of this return sliding movement of the picker-slide, when it is brought into contact with the other lug, and the short remaining movement of the slide will cause the arm to swing in the opposite direction against the pin on the opposite side thereof and so produce a slight turn of the wheel $R^3$ in the opposite direction, the action being precisely the same as described above, but producing a movement of the gear-wheel, and consequently of the two finger-shafts, in opposite directions—that is, at one end of the slide-travel the fingers will be opened and at the other end closed, as required for the described action of this sliding picker device. Obviously the movement of the picker-slide in the direction last referred to must also terminate before the swinging arm clears the lug with which it has been brought in contact, when the movement of the picker-slide commences again in the direction first described and the operation is repeated. Obviously the swinging arm must not clear either of the lugs at either movement of the picker-slide, for it is perfectly plain that if such clearance is made the return movement of the slide, which begins almost instantaneously, will reverse the swing of this arm, thereby reversing the oscillation of the gear-wheel $R^3$, and so reversing the movement of the finger-shafts and placing the fingers in an inoperative position during the reciprocation of the slide which has just commenced.

The slide R′ is reciprocated on its support by means of a bell-crank lever S, mounted pivotally at the inner end of a stud *s*, fastened to the inside of the main frame and extended inward underneath the supporting-plate $R^2$, as seen in Fig. 28. The long arm $s'$ of this lever extends upward and is connected by a link $s^2$ with the inner or forward end of the slide with respect to its movement, as seen in Figs. 28 and 29. The lower short arm $s^3$ is provided with a roller-pin at its extremity, which is fitted into a cam-groove $s^4$ of an actuating-cam S′, fixed on a shaft $s^5$, mounted in suitable bearings at the front end of the main frame and transversely thereof. The rotation of this shaft will vibrate the lever S suitably to reciprocate the picker-slide; and this rotation is effected by a shaft $S^2$, mounted in suitable bearings on the inside of the back side piece of the main frame, as seen in Fig. 26. This shaft is provided at its front end with a bevel-pinion $s^6$, which meshes with a bevel-gear $s^7$ on the cam-shaft, as seen in Figs. 4 and 28, and at its rear end is provided with a similar bevel-pinion $s^8$, which is arranged so that a bevel-gear $f^9$ on the shaft F engages with it and so imparts motion to the said shaft, and through it to the cam-shaft and picker-slide. Now the only difference between these picker devices on the opposite sides of the machine is this: The connecting-link between the actuating-lever S and the slide is shorter at the front side of the machine than at the back side, which is the one described. The reason for this is that this device arranged at the back side of the machine is intended to take the diagonal strands from the shuttles introduced to the pair of carriers at the rear edge of the carrier-beds, by which is meant the edge nearest the rear end of the machine, while the picker at the front side of the machine is intended to take the strands from the shuttles in the front pair of carriers—that is, the carriers which are nearest the front end of the machine, and consequently nearest the weaving-line. Therefore the necessary travel of this picker on the front side of the machine is less than that of the other, and to effect this difference in travel the connecting-link between the slide and the actuating-lever is shorter on this side and is marked $s^9$ in the drawings to distinguish it from the longer link $s^2$ on the opposite side of the machine, as seen in Fig. 3. The main feed is effected by a roller T, which is mounted in suitable bearings at the front end of the machine, below the supporting-plates of the diagonal pickers, as seen in Fig. 4. This roller is provided with a surface suitable for engaging with the woven fabric and pulling it along over the roller as the latter is rotated, which rotary movement is in the direction of the arrow seen in Figs. 4 and 26. A rough surface suitable for this purpose is one provided with a large number of little points thickly studding the surface and adapted to lightly engage with the woven fabric. The shaft *t* of this roller extends out beyond the main frame at the back side thereof, and a ratchet-wheel *t′* is secured to this projecting end, as seen in Fig. 3. A pawl mechanism is provided to engage with this ratchet-wheel, and by its operation gives an intermittent rotation thereto, which movement is effected by a bell-crank lever T′, mounted loosely on a suitable journal-pin projecting from the side of the machine. One arm, $t^2$, of this lever is about horizontal and carries a pawl $T^2$, pivoted near the outer end of the arm and extending upward to engage with the ratchet-wheel, the engagement being insured by a spring $t^3$, fastened to the lever-arm with its free end acting against the pawl, as seen in Fig. 26. The other arm, $t^4$, of the lever depends about vertically from the pivotal support and is provided with a long lengthwise slot $t^5$. One end of a connecting-rod or pitman $t^6$ is secured to this depending arm of the lever, being fastened in the slot thereof by a bolt and nut or other suitable device which will provide for adjustment in the slot to regulate the throw of the lever. This pitman extends toward the rear end of the machine and at its rear end is connected to a crank-arm $f^{10}$ on the end of the shaft F at the back side of the machine, as seen in Fig. 3. When this shaft F is rotated, therefore, the bell-crank lever T′ will be oscillated, thereby operating the pawl to give a certain step-by-step movement to the feed-roller. Before reaching the feed-roller the web passes over a plain guide-roller $T^3$, mounted at the front end of the machine and on a level with the weaving-line, and thence passes down to a similar roller $T^4$, arranged on a level with the feed-roller, being carried under this guide-roller and thence up over the feed-roller, as seen in Fig. 4, the two rollers $T^3$ and $T^4$ being simply for guiding purposes. The winding-drum $T^5$ is mounted below the feed-roller, and the web dropping down from the latter is wound at intervals upon this drum by hand, the drum being removable when filled.

As already stated, the picker for feeding in the filling is of ordinary and well-known construction, and the same is true of the devices for holding and guiding the filling-strand. There is the usual depending arm extending from the spool on which the filling or weft strands are wound, and carrying at its lower end the usual guide-roller and clamp. This arm is marked $c^5$ in the drawings, and obviously must pass through the upper carriage-bed, and for this purpose an opening $c^6$ is made in this bed-piece near one end thereof, as seen in Fig. 7. Just below and a little to one side of the lower guide-roll $C^2$ there is the usual spring-clamp $c^7$, which holds the end of the strand when a filling-strand drawn in by the picker is severed. The cutter U for thus severing the strand is arranged just in front of this clamp, as seen in Figs. 23 and 24. This cutter is of ordinary construction, consisting of an upper blade $u$ and a lower blade $u'$, pivoted independently to the bracket which carries the lower guide-roller. At their pivoted ends, and just about in vertical line with the pivots, one of the cutters is provided with a short stud $u^2$, which enters a suitable recess in the other blade, so that the vibration of one will also vibrate the other. As shown in the drawings, the upper blade is provided with a long finger $u^3$, extending backward and downward from the pivot. The outer end of this finger is in the plane of a cam $u^4$ on the beater-carrier, as seen in Figs. 4 and 23. When the beater-carrier is moved forward, the inclined face of this cam is brought in contact with the finger, thereby raising the latter, and as the finger is rigidly connected to the upper blade of the cutter this raising thereof will close the cutter-blades, which normally stand open, and sever the filling-strand which is drawn out between them by the picker, as seen in Figs. 23 and 24. It will be seen from the drawings that the positions and relations of these parts are such that the cutter will be operated just about the time the beater reaches the strand, which it then carries forward to the weaving-line.

At each side of the machine is a bracket V, which is fastened to the inside of the main frame about in the same vertical plane as the respective pairs of shuttle-holders. Each of these brackets has a foot by which it is fastened to its support, and they are then bent inward, the bend $v$ being on a slight incline, as seen in Fig. 2. Then they are again bent directly inward toward each other, so as to provide on each bracket a vertical cheek-piece $v'$, which is arranged to stand just inside of the plane of the block N or N', as seen in Fig. 2.

An inclined chute W is mounted on each side of the machine, projecting out therefrom some distance, as seen in Fig. 2. This chute inclines downward as it passes inward and terminates in a horizontal end $w$, and the chute is provided with a slot $w'$, running its entire length. The chute is preferably tubular, as seen in Fig. 34, and the slot is adapted to receive the shank of the T-headed pin $i^{10}$ on the upper ends of the shuttles, so that the shuttles may be slipped upon this chute by passing the said shanks into the slots, while the cross-heads of the pins will hold them therein, as seen in Fig. 34. At the same time the shuttles are free to slide along in these slots, and owing to the inclination of the chutes they will slide down the same by their own gravity until they reach the extremity of the chutes, where, as they pass off the end thereof, they are brought up against the faces of the upright stop-pieces of the brackets V, as seen in Fig. 2, in which position they are in vertical plane with the respective blocks N or N', as also seen in the said figure. This provides for the automatic feeding of the shuttles to the machine by simply placing them in the outer end of the chutes, as described. The short horizontal section at the lower end of the chute serves to arrest the movement of the shuttles and at the same time bring them into a perfectly vertical position, as seen in Fig. 2, while at the same time the gravity-pressure is sufficient to crowd a shuttle off the end of the chute against the support V whenever there is a vacancy at this point. It will be noticed that these brackets are reversed in arrangement on opposite sides of the machine. The bracket on the right-hand side of the machine opens upward, while the bracket on the left-hand side opens downward, as seen in Fig. 2. The reason for this arrangement is that the shuttles delivered to the bracket on the right-hand side are taken by the upper carrier, and so their first movement will be in an upward direction, while the shuttles delivered to the bracket at the left-hand side are taken by the lower carrier, and their first movement is therefore downward. Obviously, then, the opening from the former shuttles must be upward and that of the latter shuttles downward. As the shuttles are delivered to the bracket opening downward, as shown at the left-hand side of Fig. 2, they are forced directly against the vertical portion of the bracket by the pressure of the series of shuttles on the inclined chute, and in the bracket at the left-hand side opening downward, as seen in Fig. 2, the individual shuttle, standing directly against the vertical portion of the bracket, will be held in this position by the frictional contact occasioned by the weight of the series of shuttles immediately behind it pressing down upon it on the inclined chute until taken by its carrier, as already described.

The general operation of the machine is as follows: The warp-strands are carried in through the machine, as usual, by hand and fastened to the winding-drum at the front, each strand being double, as usual, and the said pairs arranged at the required distance apart for open-cane-weaving. The weft or filling is also wound as a single continuous strip upon a spool, as usual, and mounted with the usual devices for feeding and guiding at one side of the machine immediately opposite the weft-picker. The stationary shuttle-holders are then respectively filled with shuttles by the attendant, these shuttles being first supplied with bobbins of diagonal strands, as described above. As stated in the description above, the bobbins are intended to carry material for only one diagonal strand, each with a little excess. This is not an absolute necessity to the working of the machine, but it is preferred, because if the bobbins carry sufficient material for several strands it is necessary to provide an additional mechanism for severing each single strand. This mechanism can be supplied, if desired; but as it would further complicate the machine I prefer to fill each bobbin with a single diagonal strand. The end of the strand is passed through the perforated nose in each shuttle, leaving a projecting end $j^3$ protruding therefrom, as seen in Figs. 26 and 27. The shuttles are set and centered in the stationary holders by means of the two pins on each shuttle entering the two sockets in the holder, as described. The notched projection at the back of each shuttle extends out a little beyond the back face of the holder, as seen in Fig. 6. The spring hooks or catches are intended to engage with these notches in the backs of the shuttles to secure the shuttles to the holders; but these springs stand straight with the rear faces of the holders, as already described, and therefore when a shuttle is set in a holder its spring is forced back slightly by the rear extension and engages with the notch in the shuttle in the position shown in said Fig. 6, in which it will be seen that the inclined point of the spring is forced outward from the shuttle somewhat, so that there is quite a little space between the sharp extremity and the back edge of the shuttle. After the shuttles are set in place in the holders the projecting strands are pulled out by an attendant and carried through the grip-rollers, which will then hold the strands in working position. Shuttles are also placed in the feed-chutes, and the first one will be carried down into the position shown in Fig. 2, which illustrates the arrangement for the front pair of shuttle-holders at the right hand and for the rear pair at the left hand of said figure, the front pair being the nearest to the weaving-line. The machine is then set in operation, and the first movement is the approach of the carriages toward each other. This brings the movable shuttle-holders into contact with the shuttles and the engagement of the latter in said holders by the pins, as already described, and in this movement the tips of the spring-catches on the vacant holders, standing straight, will pass just inside the tips, engaging with the shuttles on the fixed or filled holders, on account of the small space between the back edges of the shuttles and the tips of the catches engaging them, just mentioned above, thereby forcing the said spring-catches out from engagement with the notches in the shuttles and themselves engaging with the said notches in place of the former catches, as illustrated in Fig. 26. The shuttles are thus transferred from the stationary holders to the movable holders, and at the same time the blocks N receive and engage the shuttles standing in position at the extremities of the chutes. When the carriages come together, the shuttles are transferred from one holder to the other, as just described, and the carriages immediately retreat. At their extreme point of separation the carriages rest, during which period the mechanism for weaving the plain mat is brought into operation, and also the diagonal-strand pickers, which quickly draw out and feed into the gripping-rollers the strands in the shuttles fed down at the end of the chutes, so that these strands will be properly placed and fastened before said shuttles are moved. The general movement and action of this diagonal-strand picker have been described. As stated, it passes in with the fingers open, and this movement is continued and terminated when these open fingers have passed a little over the nose of the shuttle, as seen in Fig. 30. The instant the return movement is commenced the fingers close upon the nose, as seen in the said figure, and slip off therefrom to seize the projecting end of the diagonal strand, and the further retreating movement of the fingers pulls out this strand and feeds the end into the gripping-rollers by the ends of the fingers passing in between the said rollers, as already stated, and the fingers are then opened after passing the rollers. The spring-grip of the fingers upon the strand is very slight, and it is intended that there shall be a slight movement of the fingers along the strand, so as to straighten out the projecting end thereof before reaching the grip-rollers. The two carriages now recede from each other, and obviously the shuttles will be carried away by the movable holders on the respective bed-pieces. About at the end of this retreating movement the mechanism for operating the sliding shuttle-holders is brought into action, and these holders are moved just one step inward, and at the same time the blocks N are brought up into contact with these holders, as already described. The retreating movement of the carriages will of course carry the shuttles away from the warp in vertical planes corresponding to the spaces between the warp-strands. The subsequent side movement of the holders will carry the shuttles sidewise into planes corresponding to the next places between the warp-strands, so that obviously the diagonal strands will be carried across the adjacent warp-strands, one pair of holders carrying a strand over and the other pair under the said warp-strands. The blocks N are carried inward at the same time with the sliding holders, thereby setting the new shuttles in also one step so that each stands in the same plane as the first shuttle-socket in the corresponding fixed shuttle-holder. A second movement of the carriers toward each other follows immediately and before the beater acts, thereby completing the filling in of the diagonal strands one step over or under the warp-strands, and the shuttles are transferred again from the movable holders to the stationary holders and the carriages separate, leaving the shuttles in the stationary holders. During this second separating movement the oscillating shaft acts to move the sliding holders and blocks N outward again to their first position. The weft-picker is brought into operation at this interval and quickly makes a reciprocation to draw in a filling-strand in the usual way. The operation of the beater quickly follows to beat up this strand, when the heddles change and this operation is repeated, so that the two filling-strands are beat up to the weaving-line in the usual way, and the main feeding mechanism is then brought into action to feed the warp along one step. The series of movements described above is then repeated, and so it will be seen that the diagonal strands are woven in step by step by the reciprocation of the carriages, which bear the shuttle-holders, and the side movement of the said shuttle-holders, and the shuttles one after another will reach the opposite or finishing end of their respective holders, when they will be taken from the last socket in the stationary holders by the blocks N′, and on the next receding movement of the carriers will be moved outward away from the shuttle-holders and outside of the warp by the side movement of the said blocks, already described, when they are removed by an attendant at the side of the machine, who disengages and detaches the shuttles from the block at each side of the machine. The back inclination of the beater is to accommodate the inclined diagonal strands, as seen in Figs. 1 and 4.

The driving mechanisms are so related that a double reciprocation of the carriages is made between each operation of the beater, so that two diagonal strands will be inserted for each action of the beater in order to produce the usual type of fabric for cane seats.

It will be understood, of course, that the operating devices for the different mechanisms, which have been described above in detail, are timed so that the several steps of the operation specified will occur in their proper order and at proper intervals to effect the results set forth. This is of course a mere matter of mechanical calculation, and a specific description in detail of the number of teeth in every gear and the actual contour of every cam is not necessary. As already stated the two pairs of shuttle-holders, with their operative mechanism, are constructed and adapted to put in the two usual diagonal strands, and so are organized to work in opposite directions—that is, from opposite edges of the warp—and in carrying out this plan of operations it is evident that the movements of like devices in the two pairs must be in opposite directions—that is, the movable shuttle-holders and movable shuttle-blocks are arranged in opposition to each other and their actuating mechanism operates in opposite directions, so that the step-by-step movement to carry the diagonal strands across the warp-strands will be in one direction with one pair and in the opposite direction with the other pair of holders.

It is obvious that in the operation of the particular machine shown and described the shuttles must be introduced one at a time, the strands being drawn through gripping-rollers Q Q′ and so be allowed to weave into the machine diagonally by reason of their progress laterally at each pick of the loom, in which case the cloth would be without diagonal strands at one corner until the shuttles had reached across the mat, or else, if it were desired to make the mat complete from the beginning, the shuttles would necessarily have the ends of their strands introduced between the rollers Q Q′ at the start. Where each shuttle carries more than enough cane for a single diagonal strand, the cane should of course be trimmed or cut off as each diagonal strand issues at the edge of the fabric, and a projecting portion should be left to be afterward drawn into engagement with the rollers Q Q′ when the shuttle is reintroduced into the machine.

It will be seen that by this invention I produce a single machine in which the entire work of open-cane-weaving is performed without transfer from one machine to another and a finished product ready for the various uses to which this fabric is applied is delivered at the front or finishing end of the machine. I believe that in this respect this is an entirely new machine, and, so far as I know, I am the first to produce a single machine upon which the entire work of open-cane-weaving is performed; and therefore I claim this fundamental invention, whereby there is produced for the first time a single machine which will perform the entire work of open-cane-weaving.

In special devices and in their particular construction and arrangement there may be many modifications in different parts of the machine, and I do not intend to limit my invention, broadly considered as a foundation invention, to the specific constructions here shown and described; but, on the contrary, I contemplate such modifications as may be made without losing the main features of the invention as set forth above.

I claim as my invention—

1. In a machine for weaving open-mesh cane-cloth, the combination of warp-feeding mechanism, diagonal-strand-carrying devices, means for moving the said carrying devices in planes perpendicular to the plane of the fabric, and means to move the said devices also in planes transverse thereto across the fabric, weft-feeding devices and means to operate the same to insert a weft-strand after each operation of the diagonal-strand-carrying devices.

2. In a machine for weaving open-mesh cane-cloth, the combination of warp-feeding mechanism, diagonal-strand-carrying devices, means for moving the said carrying devices in planes perpendicular to the plane of the fabric and means to move the said devices also in planes transverse thereto across the fabric as it is being fed forward, weft-feeding devices means to operate the same to insert two weft-strands after each operation of the diagonal-strand-carrying devices.

3. In a machine for weaving open-mesh cane-cloth, the combination of the warp-feeding mechanism, the harness, means for operating it, mechanism for weaving strands diagonally across the fabric alternately with the operations of the harness, the picker, means for operating it immediately after each operation of the diagonal-strand-weaving mechanism, a beater, and means for operating it to beat up the filling inserted by the picker.

4. In a machine for weaving open-mesh cane-cloth, the combination of the warp-feeding mechanism, a series of shuttles or diagonal-strand carriers on opposite sides of the horizontal plane of the fabric, means for moving said shuttles toward and from each other in planes perpendicular to the horizontal plane of the fabric, means for moving the two series of shuttles in opposite directions transversely to the warps across the fabric, and means for inserting the filling.

5. In a machine for weaving open-mesh cane-cloth, the combination with the warp-feeding and weft-inserting mechanism, of devices operated step by step after each operation of the weft-inserting mechanism to interweave strands diagonally across the fabric.

6. In a machine for open-cane-weaving, mechanism for weaving the mat, in combination with a pair of carriages arranged transversely of the machine above and below the warp respectively, means for moving said carriages toward and from each other, a pair of shuttle-holders, one movable and the other stationary, arranged on the respective carriages, a series of shuttles carrying bobbins on which are wound the diagonal strands, mechanism for transferring said shuttles from one holder to the other as the carriages are brought together, and mechanism for reciprocating each movable holder to set the shuttles inward one step while held thereby, substantially as described.

7. In a machine for open-cane-weaving, mechanism for weaving the mat, in combination with a pair of guiding and gripping rollers arranged just in front of the weaving-line, a pair of carriages arranged respectively above and below the warp and adapted to move vertically to and from each other, mechanism for reciprocating the said carriages, movable and fixed shuttle-holder mounted on the respective carriages, diagonal-strand shuttles mounted in said holders, mechanism for connecting and disconnecting said shuttles from said holders and transferring them from one holder to the other, and mechanism for imparting a step-by-step movement to each movable holder while the shuttles are held therein, substantially as described.

8. In a machine for open-cane-weaving, mechanism for weaving the mat, in combination with vertically-movable carriages, K K′, arranged transversely of the warp and adapted to be moved toward and from each other vertically, means for reciprocating said carriages, a movable shuttle-holder, L, and stationary holder, L′, mounted on each carriage and provided with sockets, and the diagonal strand shuttles, I, provided with pins, $i^8$ $i^9$, adapted to be set in the said sockets of the holders respectively, substantially as described.

9. In a machine for open-cane-weaving, mechanism for weaving the mat, in combination with vertically-movable carriages, K K′, arranged transversely of the warp and adapted to be moved toward and from each other vertically, means for reciprocating said carriages, a movable shuttle-holder, L, and stationary holder, L′, mounted on each carriage and provided with sockets, the diagonal-strand shuttles, I, provided with pins, $i^8$ $i^9$, adapted to be set in the said sockets of the holders respectively, and mechanism for fastening the shuttles to the holders and for disconnecting and transferring them from one holder to the other, substantially as described.

10. The carriages, K K′, arranged transversely of the warp and above and below the same respectively, in combination with mechanism for reciprocating said carriages toward and from each other, movable and stationary shuttle-holders, L L′, mounted on the respective carriages, diagonal-strand shuttles, I, adapted to be set loosely in said holders and provided with a rear notch, $i^5$, and the spring-catches, I′ $I^2$, mounted respectively on the holders, adapted to engage with the notches in the shuttles and to automatically disconnect one from the shuttle and connect the other therewith when the carriages are brought together, substantially as described.

11. In a machine for open-cane-weaving, mechanism for weaving the mat, in combination with vertically-movable carriages, K K′, arranged above and below the warp and transversely thereof, movable and stationary shuttle-holders, L L′, connected to the respective carriages, diagonal-strand shuttles, I, adapted to be set in said holders loosely, devices for fastening the shuttles to said holders and transferring them from one holder to the other automatically, mechanism for giving a single step-by-step reciprocation to each movable holder to move the shuttles therein from one warp interspace to the next, and mechanism adapted to reciprocate said carriages at suitable intervals, substantially as described.

12. The reciprocating carriages, K K′, in combination with the movable and stationary shuttle-holders, L L′, provided with sockets, the diagonal-strand shuttles, I, provided with pins, $i^8$ $i^9$, adapted to said sockets, the rear notch, $i^5$, in each shuttle, spring-catches, I′, $I^2$, fastened to the respective holders, standing normally a little within the said notches in the shuttles, and provided with long, inclined hooks or catch-points, $i^{11}$, whereby the catches are automatically disconnected and connected with the shuttles when the holders are brought together by the reciprocation of the carriages, substantially as described.

13. In a machine for open-cane-weaving, mechanism for weaving the mat, in combination with a pair of carriages arranged transversely of the warp above and below the same and adapted to move vertically, mechanism for reciprocating said carriages at intervals, movable and stationary shuttle-holders arranged transversely on the said carriages, diagonal-strand shuttles adapted to be set in said holders, mechanism for securing the shuttles to said holders and automatically disconnecting and transferring them from one to the other, a feed device adapted to automatically feed the shuttles into the machine near the meeting space of the carriages, and mechanism for automatically picking up a shuttle at this point when the carriages are brought together and transferring it to the regular shuttle-holder, substantially as described.

14. In a machine for open-cane-weaving, the harness and mechanism for operating the same, in combination with a pair of gripping-rollers arranged in front of and in proximity to the weaving-line, mechanism for inserting or weaving in the diagonal strands and inserting the ends thereof between the rolls, the filling picker and mechanism adapted to operate the same immediately after the operation of the diagonal-strand mechanism, and a beater with mechanism arranged to operate the same immediately after the operation of the filling-picker, substantially as described.

15. In a machine for open-cane-weaving, mechanism for weaving the mat, in combination with a pair of carriages arranged transversely of the warp above and below the same and adapted to move vertically, mechanism for reciprocating said carriages at intervals, movable and stationary shuttle-holders arranged respectively on the said carriages, diagonal-strand shuttles adapted to be set in said holders, mechanism for securing the shuttles to said holders and automatically disconnecting and transferring them from one holder to the other, and mechanism for automatically removing a shuttle to one side of and beyond the warp at the end of its working travel, substantially as described.

16. In a machine for open-cane-weaving, the diagonal-strand shuttle, I, provided with a perforated nose, $i^6$, a diagonal-strand bobbin mounted in said shuttle and with the end of the strand projecting through said nose, a support at one end of the machine to which the shuttles are successively fed, and a picker adapted to move lengthwise of the machine to seize the projecting end of the said strand and draw it out toward the front of the machine, and a holding device to which said picker delivers the end of the strand, substantially as described.

17. In a machine for open-cane-weaving, the diagonal-strand shuttles, I, provided with perforated noses, $i^6$, at the front edge thereof, in combination with diagonal-strand bobbins, J, mounted in said shuttles and with the ends of the strands projecting through said perforated noses, a support at the side of the machine for said shuttles, an automatic feed device adapted to deliver the shuttles successively to said support, a picker adapted to move lengthwise of the machine and to seize and draw out the projecting strands, and grip-rollers in front of the weaving-line to which the picker delivers the ends of the diagonal strands, substantially as described.

18. In a machine for open-cane-weaving, the sliding beater-frame, in combination with the beater, G′, composed of a pivoted cross-bar, $g'$, mounted in the frame, and arms, $g^2$, secured to said bar and constructed with short vertical tips, and bodies inclined backward from said tips to the cross-bar, substantially as described.

19. In an open-cane-weaving machine, the sliding beater-frame, G, mounted in guide-ways, $g$, in combination with the cross-bar, $g'$, journaled in said frame and provided with beater-arms, $g^2$, a cam-guide, $G^2$, provided with a straight groove, $g^7$, and a broken groove or passage, $g^8$, a switch, $g^9$, pivoted in said guide, a bell-crank, $g^5$, and a link-rod, $g^4$, connecting said bell-crank with a crank-arm, $g^3$, on the beater cross-bar, substantially as described.

20. In a machine for open-cane-weaving, the shaft, F, in combination with the sleeve, H, mounted loosely thereon and provided with a disk, $h$, fixed on the end thereof and having a lug, $h'$, on its outer face extending into the shaft, a pinion, $f^7$, mounted loosely on said shaft and provided with a lug, $f^8$, on its inner face with a free space between it and the shaft, a T-headed spring-clutch, $F^2$, pivoted to the disk, the driving gear-wheel, $B^2$, provided on one face with a semicircular rim-flange, $b^4$, adapted to act upon the pawl to hold it from engagement with the lug, $f^8$, and an eccentric, $h^2$, on the sleeve connected with the sliding beater-frame to reciprocate the same when the pawl is released from the rim-flange and thereby the pinion and disk are clutched together, substantially as described.

21. The shuttles, I, each consisting of a rim, $i$, the inner face of which is a complete circle and provided with a rabbet, $i'$, on the inner edge of one side thereof, in combination with the bobbins, J, each composed of two circular disks of unequal size joined by a short hub and adapted to fit the central opening of the holder with the edge of the larger disk resting upon the side rabbet thereon, and a fastening device for securing the cop in the shuttles, substantially as described.

22. The shuttles, I, each consisting of a rim, $i$, the inner face of which is a complete circle and provided with a rabbet, $i'$, on the inner edge of one side thereof, in combination with the bobbins, J, each composed of two circular disks of unequal size joined by a short hub and adapted to fit the central opening of the shuttle with the edge of the larger disk resting upon the side rabbet thereon, and buttons, $i^3$, pivoted in grooves in the shuttle and adapted to turn inside of the smaller disk of the bobbin, substantially as described.

23. In an open-cane-weaving machine, the shuttles, I, provided with T-headed pins, $i^{10}$, in combination with inclined guide-chutes, W, provided with slots, $w$, adapted to receive said pins on the shuttles, and a supporting-stop on the inside of the frame to which the shuttles are delivered by sliding down the chutes, substantially as described.

24. In a machine for open-cane-weaving, the main frame, A, in combination with upright standards or posts, $a'$, rising from each side thereof and having V-shaped inner edges, $a^2$, in combination with the carriages, K K', consisting of bed-pieces, $k$, and rectangular end pieces, $k'$, provided with rollers, $k^3$, at each corner adapted to fit the guideways of the respective standards, diagonal-strand shuttles mounted on said carriages, mechanism for operating the shuttles for weaving in the diagonal strands, and mechanism for reciprocating the said carriages toward and from each other, substantially as described.

25. The upright guide-standards, $a'$, in combination with the carriages, K K', mounted and guided within said standards, diagonal-strand shuttles mounted on said carriages, mechanism for operating the diagonal-strand shuttles mounted on and carried by said carriages, the shaft, P, provided with crank-arms, $p$, eccentrics, $p^2$, pitmen, $p'$ and $p^4$, levers P', link-bars, $p^5$, and mechanism for intermittingly rotating said shaft, P, from the main shaft, substantially as described.

26. The vertically-movable carriages, K K', arranged one above and the other below the warp and having horizontal bed-pieces, $k$, arranged transversely of the machine, in combination with sliding shuttle-holders L, mounted in guideways on the faces of said beds and running lengthwise thereof, stationary shuttle-holders, L', fixed on said faces of the beds directly opposite to the respective movable holders, levers $L^2$ $m^5$, pivoted to the backs of the respective bed-pieces, links, $m^6$, connecting-rods, $M^2$, a rock-shaft M, to which said rods are connected, and mechanism for oscillating said shaft at intervals, substantially as described.

27. The reciprocating carriages, K K', having horizontal beds, $k$, the sliding shuttle-holders, L, mounted in guideways on the faces of said beds, the levers, $L^2$ $m^5$, connected with the sliding holders by suitable links, connecting-rods, $M^2$, a rock-shaft, M, connected to the rods, $M^2$, shuttle-blocks, N, mounted in the same guideways with the sliding shuttle-holders and connected directly to the rods, $M^2$, and mechanism for oscillating said shaft at suitable intervals, substantially as described.

28. The reciprocating carriages, K K', having horizontal beds, $k$, the sliding shuttle-holders, L, mounted in guideways on the faces of said beds, the levers, $L^2$ $m^5$, connected with the sliding holders by suitable links, connecting-rods, $M^2$, rock-shaft, M, connected to the rods, $M^2$, and blocks, N', mounted in the same guideways as the sliding shuttle-holders but at the outer or rear ends thereof, connected directly to the rods, $M^2$, and adapted to take a shuttle at the end of its step-by-step movement across and through the warp and move it some distance beyond the latter, substantially as described.

29. The reciprocating carriages, K K', in combination with the sliding shuttle-holders mounted on the bed-faces of said carriages, mechanism also mounted on said carriages and arranged to act directly on said holders to impart to them a sliding movement, upright rock-shaft, M, sleeves, M', splined to said rock-shaft and held to the respective bed-pieces by inclosing brackets, $N^2$, fixed on said beds, connecting devices uniting crank-arms on said sleeves with the actuating mechanism of the movable shuttle-holders whereby the said actuating mechanism is operated, an oscillating bell-crank, $M^3$, provided with a rack-segment, $m^8$, on one arm engaging with a pinion, $m$, on the lower end of the oscillating shaft, a revolving cam, $M^4$, with its cam-groove engaging the other arm of the said lever, and mechanism for rotating said cam at intervals from the gear-wheel, $B^3$, on the main wheel of the driving-shaft, substantially as described.

30. In a machine for open-cane-weaving, the diagonal-strand picker-shaft, $r$, in combination with a sleeve-shaft, $r^3$, mounted loosely thereon, gripping-fingers, $r^5$ $r^4$, attached to the inner ends of these respective shafts, a bow-spring, $r^6$, connecting said fingers, pinions, $r^7$ and $r^8$, on the outer ends of said shafts, a bevel-gear, $R^3$, arranged to engage with the respective pinions, a sliding support on which these shafts and gears are mounted, shuttles, I, provided with perforated noses, $i^6$, mechanism for reciprocating said sliding support to and from the shuttles, and mechanism for oscillating the said bevel-gear by the movement of the slide to open and close the fingers, substantially as described.

31. In a machine for open-cane-weaving, the diagonal-strand picker-shaft, $r$, in combination with a sleeve-shaft, $r^3$, mounted loosely thereon, gripping-fingers, $r^5$ and $r^4$, attached to the inner ends of these respective shafts, a bow-spring, $r^6$, connecting said fingers, pinions, $r^7$ and $r^8$, on the outer ends of said shafts, a bevel-gear, $R^3$, arranged to engage with the respective pinions, a sliding support on which these shafts and gears are mounted, shuttles, I, provided with perforated noses, $i^6$, mechanism for reciprocating said sliding support to and from the shuttles, and the yielding grip-rollers at the rear of the weaving-line, substantially as described.

32. In a machine for open-cane-weaving, a sliding support, R′, mounted in ways at the front of the machine adapted to move lengthwise thereof, and provided with upright lugs, $r^{12}$ and $r^{13}$, in combination with a solid shaft, $r$, mounted in a journal-bearing on said support, a sleeve-shaft, $r^3$, mounted loosely on the shaft, $r$, grip-fingers, $r^5$ and $r^4$, on the inner ends of these respective shafts, a bow-spring, $r^6$, connecting said fingers, bevel-pinions, $r^7$ $r^8$, on the outer ends of said shafts, a bevel-gear, $R^3$, mounted on a journal at right angles to said shafts and arranged to engage with their respective pinions, and having on its outer face two projecting pins, $r^{10}$ $r^{11}$, a swinging arm, $R^4$, mounted loosely on the journal of said wheel and dropping between the two pins thereon to the plane of the lugs on the sliding support, and mechanism for reciprocating said sliding support at suitable intervals, substantially as described.

33. In a machine for open-cane-weaving, the sliding support, R′, in combination with a diagonal-strand picker mechanism mounted thereon, a bell-crank lever, S, connected at one end to said slide, a cam, S′, provided with a cam-groove, $s^4$, arranged to engage the other or short arm of said lever, and mechanism for imparting an intermittent rotation with the shaft of said cam from the main shaft, substantially as described.

34. The combination with a vertically-moving carriage of a sliding shuttle-holder thereon, a shuttle feed-chute, and a reciprocating block for transferring a shuttle from the chute to the end of the sliding holder close to the other shuttles carried thereby.

35. The combination with the warp-feeding and weft-inserting mechanism, of the diagonal-strand carriers, means for actuating them, the gripping devices, a picker for drawing diagonal strands into the bite of the gripping devices, and means for actuating said picker.

36. In a machine for weaving open-mesh cane-cloth, the combination with the warp-feeding and weft-inserting mechanism, of the vertically-reciprocating shuttles or diagonal-strand carriers, the pickers reciprocating parallel with the warps and toward and from the carriers, the gripping-rollers into the bite of which the pickers draw the diagonal strands, and means for actuating the pickers.

37. In a machine for weaving open-mesh cane-cloth, the combination of warp-feeding mechanism operated step by step, means for applying a tension to the warps, heddles for forming a shed, diagonal-strand-carrying devices, means for moving the said carrying devices in planes perpendicular to the plane of the fabric, and means for moving the said devices also in planes transverse thereto across the fabric, weft-inserting devices, means for operating the weft-inserting devices to insert two weft-strands after each operation of the diagonal-strand-carrying devices, means for causing the diagonal-strand-carrying devices to rest while the weft is being inserted, and means for causing the weft-inserting devices to rest while the diagonal-strand-carrying devices are in operation.

38. In a machine for weaving open-mesh cane-cloth, the combination of warp-feeding mechanism, diagonal-strand-carrying devices, means for moving the said carrying devices in planes perpendicular to the plane of the fabric, and means to move said devices also in planes transverse thereto across the fabric, heddles for forming the shed, weft-inserting devices, means for operating them to insert a weft-strand after the operation of the diagonal-strand-carrying devices, means for then changing the heddles, means for then inserting another weft-strand, and devices for then bringing into operation the diagonal-strand-carrying devices.

39. In a machine for weaving open-mesh cane-cloth, the combination of warp-feeding mechanism, comprising tension devices and take-up devices, diagonal-strand-carrying devices, means for moving the said carrying devices in planes perpendicular to the plane of the fabric, and means to move said devices also in planes transverse thereto across the fabric, weft-inserting devices, shed-forming mechanism, means for operating the weft-inserting devices after each operation of the diagonal-strand-carrying devices to insert a single thread, means for then changing the heddles, devices for then causing the weft-inserting devices to insert another strand, and means for then bringing into operation the diagonal-strand-carrying devices.

40. In a machine for weaving open-mesh cane-cloth, the combination with the warp-feeding and weft-inserting mechanism, of diagonal-strand carriers, and mechanism for moving said carriers through the fabric and for drawing the thread therefrom to interweave strands diagonally across the fabric as it is step by step advanced after each operation of the weft-inserting mechanism.

In testimony whereof I have hereunto set my hand this 28th day of January, 1896.

HENRY B. MORRIS.

Witnesses:
ARTHUR N. GITTINGS,
EDMUND MORRIS.